(12) United States Patent
Awad et al.

(10) Patent No.: US 10,694,524 B2
(45) Date of Patent: Jun. 23, 2020

(54) COMMUNICATION SYSTEM

(71) Applicant: NEC Corporation, Minato-ku, Tokyo (JP)

(72) Inventors: Yassin Aden Awad, Uxbridge (GB); Yuhua Chen, London (GB); Vivek Sharma, Sutton (GB)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/512,596

(22) PCT Filed: Sep. 15, 2015

(86) PCT No.: PCT/JP2015/004690
§ 371 (c)(1),
(2) Date: Mar. 20, 2017

(87) PCT Pub. No.: WO2016/047097
PCT Pub. Date: Mar. 31, 2016

(65) Prior Publication Data
US 2017/0295570 A1   Oct. 12, 2017

(30) Foreign Application Priority Data

Sep. 23, 2014  (GB) .................................. 1416796.9

(51) Int. Cl.
*H04W 72/04*   (2009.01)
*H04W 4/70*    (2018.01)

(52) U.S. Cl.
CPC .......... *H04W 72/048* (2013.01); *H04W 4/70* (2018.02); *H04W 72/0413* (2013.01); *H04W 72/0446* (2013.01)

(58) Field of Classification Search
CPC . H04W 72/048; H04W 4/70; H04W 72/0413; H04W 72/0446
See application file for complete search history.

(56) References Cited

U.S. PATENT DOCUMENTS

2011/0235602 A1*  9/2011  Ji ........................ H04L 5/0007
                                                            370/329
2012/0002631 A1   1/2012  Nishio et al.
(Continued)

FOREIGN PATENT DOCUMENTS

CN          103024907 A    4/2013
GB            2510140 A    7/2014
(Continued)

OTHER PUBLICATIONS

The 3rd Generation Partnership Project (3GPP), "Frequency Hopping and Transmit Diversity for PUCCH format 2/2a/2b", LG Electronics, Jan. 2010, 3GPP TSG RAN WG1 #59 bis, R1-100657, Valencia, Spain, cited in JPOA.

(Continued)

*Primary Examiner* — Jeffrey M Rutkowski
*Assistant Examiner* — Chae S Lee

(57) ABSTRACT

A communication system is described in which machine-type communication devices having a reduced bandwidth can be allocated physical uplink control channel resources that fall within that reduced bandwidth whilst other, legacy, devices can continue to use physical uplink control channel resources that do not fall within that reduced bandwidth.

17 Claims, 11 Drawing Sheets

Rel-8 PUCCH slot hopping and PUCCH mapping to PRBs

(56) References Cited

U.S. PATENT DOCUMENTS

| | | | | |
|---|---|---|---|---|
| 2013/0100900 | A1* | 4/2013 | Lee | H04W 4/70 370/329 |
| 2014/0241261 | A1 | 8/2014 | Ratasuk et al. | |
| 2014/0321405 | A1* | 10/2014 | Heo | H04B 1/7143 370/329 |
| 2015/0270868 | A1 | 9/2015 | Park | |
| 2015/0327239 | A1 | 11/2015 | Webb et al. | |
| 2015/0373690 | A1 | 12/2015 | Webb et al. | |
| 2016/0037514 | A1* | 2/2016 | Xiong | H04W 4/70 370/336 |
| 2016/0081084 | A1* | 3/2016 | Blankenship | H04W 4/70 370/329 |
| 2017/0207815 | A1* | 7/2017 | Chae | H04B 1/713 |

FOREIGN PATENT DOCUMENTS

| | | |
|---|---|---|
| GB | 2510141 A | 7/2014 |
| KR | 10-2013-0044137 A | 5/2013 |
| KR | 2014-0006706 A | 1/2014 |
| RU | 2502230 C2 | 12/2013 |
| WO | 2013/127634 A1 | 9/2013 |
| WO | 2014/131789 A1 | 9/2014 |

OTHER PUBLICATIONS

The 3rd Generation Partnership Project (3GPP), "PUCCH for Rel-13 Low complexity MTC", NEC, Nov. 2014, 3GPP TSG RAN WG1 Meeting #79, R1-144862, San Francisco, USA, cited in JPOA.

Japanese Office Action for JP Application No. 2017-516005 dated Mar. 28, 2018 with English Translation.

3rd Generation Partnership Project; Technical Specification Group Services and System Aspects; Service requirements for Machine-Type Communications (MTC); Stage 1 (Release 13), 3GPP TS 22.368 V13.0.0 (Jun. 2014).

3rd Generation Partnership Project; Technical Specification Group Radio Access Network; Evolved Universal Terrestrial Radio Access (E-UTRA); Multiplexing and channel coding (Release 12) , 3GPP TS 36.212 V12.1.0 (Jun. 2014).

3rd Generation Partnership Project; Technical Specification Group Radio Access Network; Evolved Universal Terrestrial Radio Access (E-UTRA); Physical layer procedures (Release 12), 3GPP TS 36.213 V12.2.0 (Jun. 2014).

Intel Corporation, "Discussion on PUCCH coverage enhancements for low-cost MTC", 3GPP DRAFT;R1-133156, 3GPP TSG-RAN WG1 Meeting #74, Mobile Competence Centre; 650, Route Des Lucioles, Barcelona, Spain; Aug. 19-Aug. 23, 2013.

International Search Report for PCT Application No. PCT/JP2015/004690, dated Dec. 18, 2015.

Written opinion of the International Search Authority for PCT Application No. PCT/JP2015/004690.

Russian Office Action for RU Application No. 2017113916/08(024352) dated May 16, 2018 with English Translation.

Huawei, et al., "Reducing peak rate and transmission modes for low-cost MYC UE", Discussion and Decision, 3GPP TSG RAN WG1#68, R1-120053, Feb. 6-10, 2012, 6 pages total.

Catt, "Discussion on the bandwidth reduction for low cost MTC UEs", Discussion and Decision, 3GPP TSG RAN Meeting #68, R1-120114, Feb. 6-10, 2012, 3 pages total.

Communication dated Mar. 15, 2019, issued by the Korean Intellectual Property Office in corresponding application No. 10-2017-7010847.

Chinese Office Action for CN Application No. 201580051565.5 dated Aug. 1, 2019 with English Translation.

\* cited by examiner

[Fig. 1]
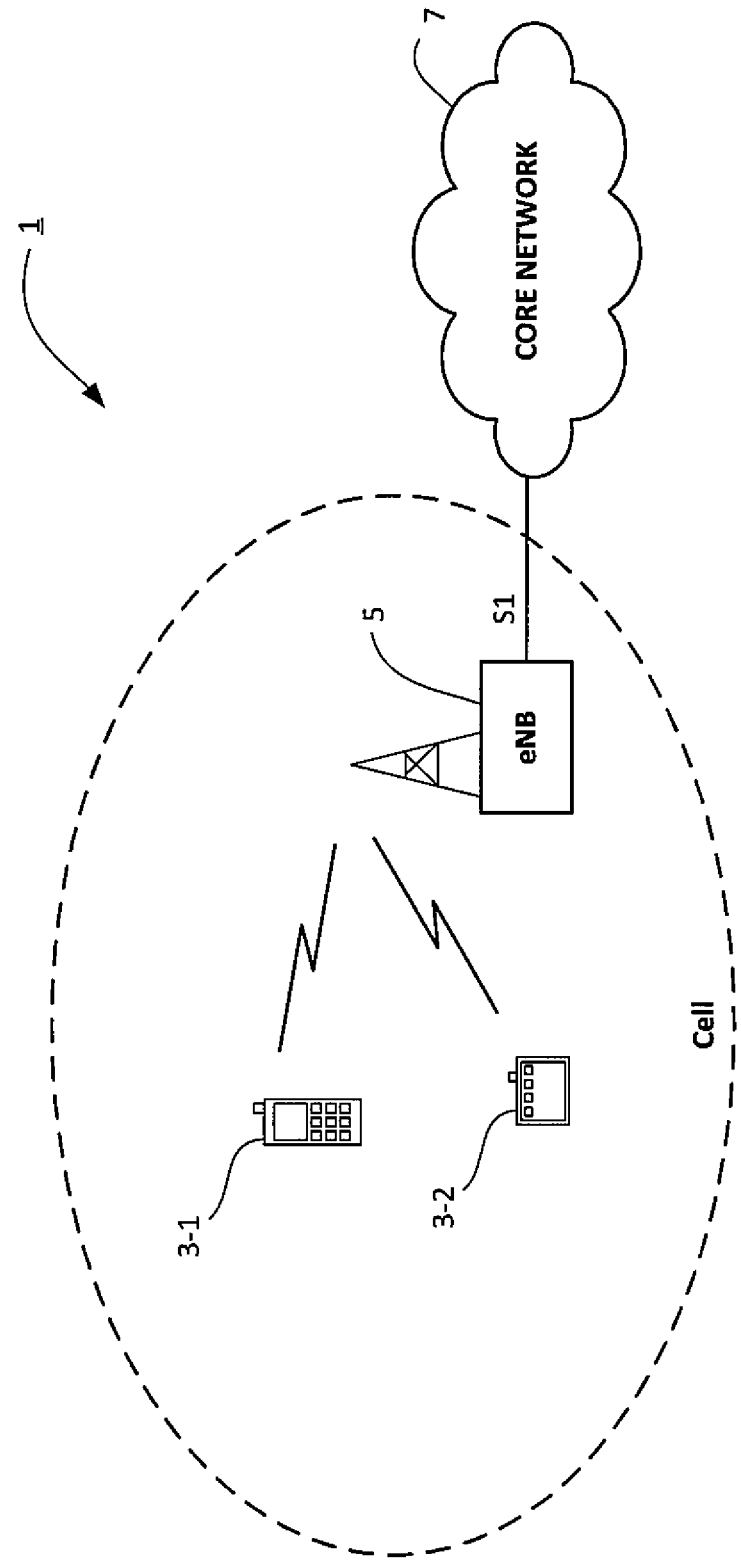

[Fig. 2]
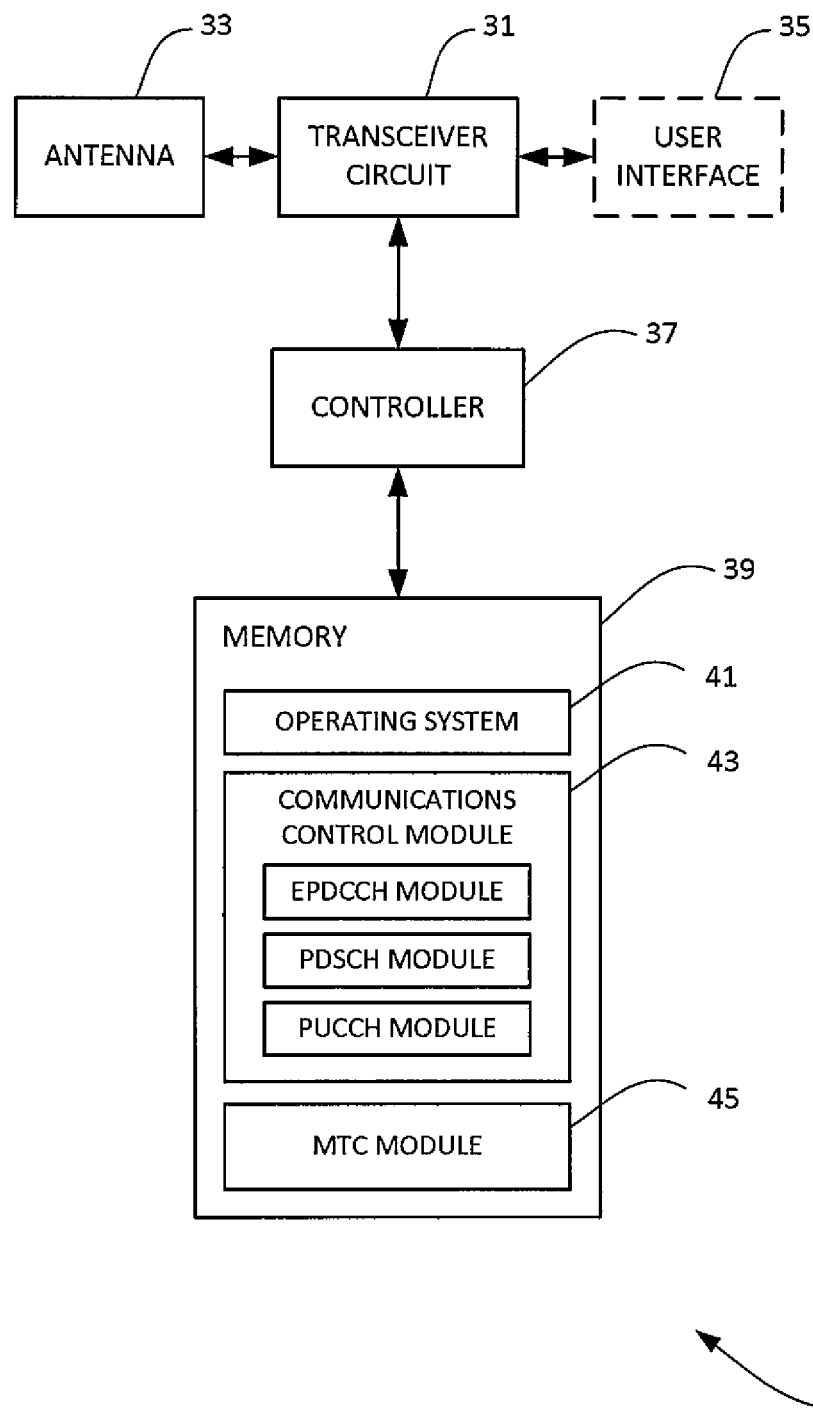

[Fig. 3]
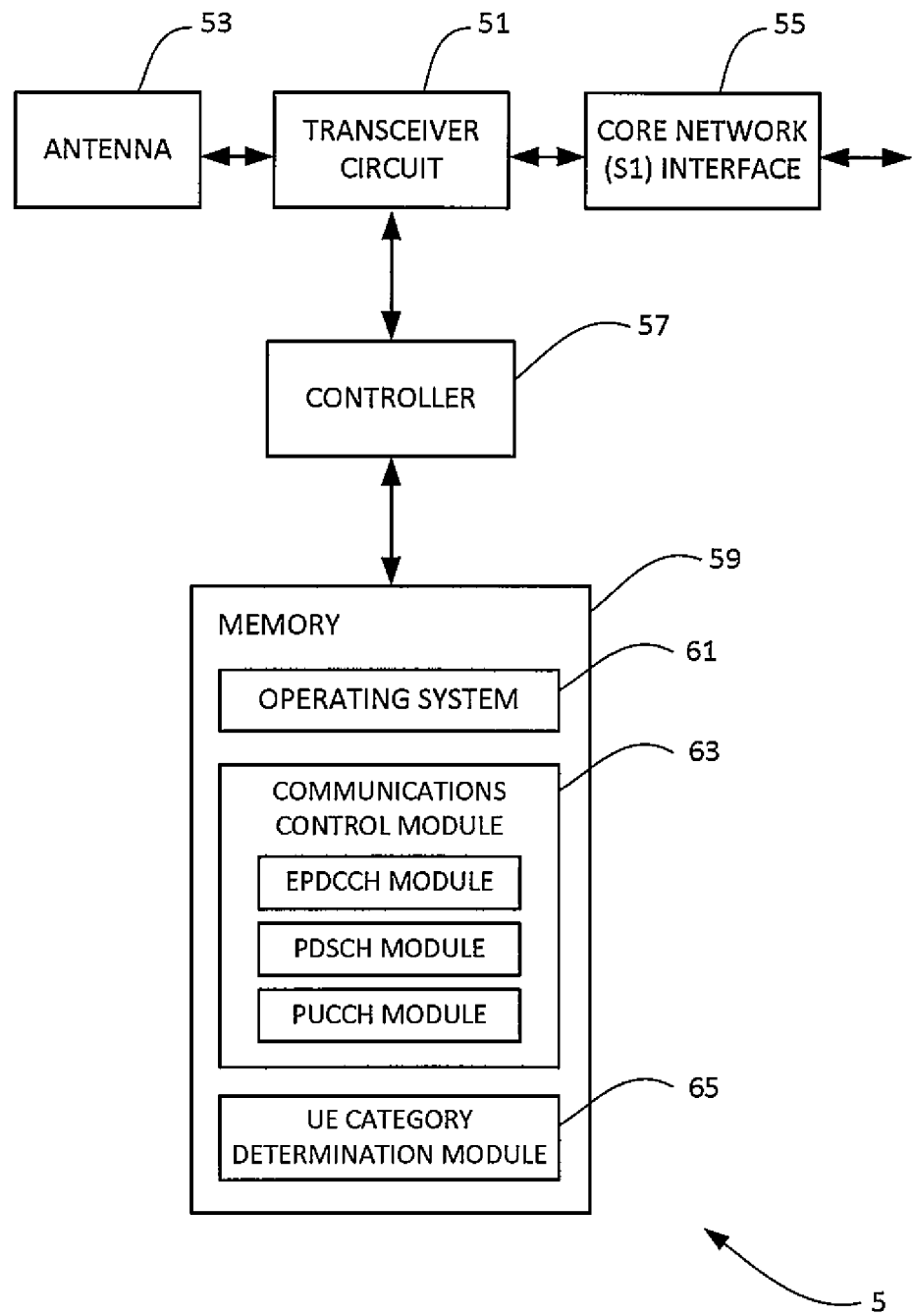

[Fig. 4]
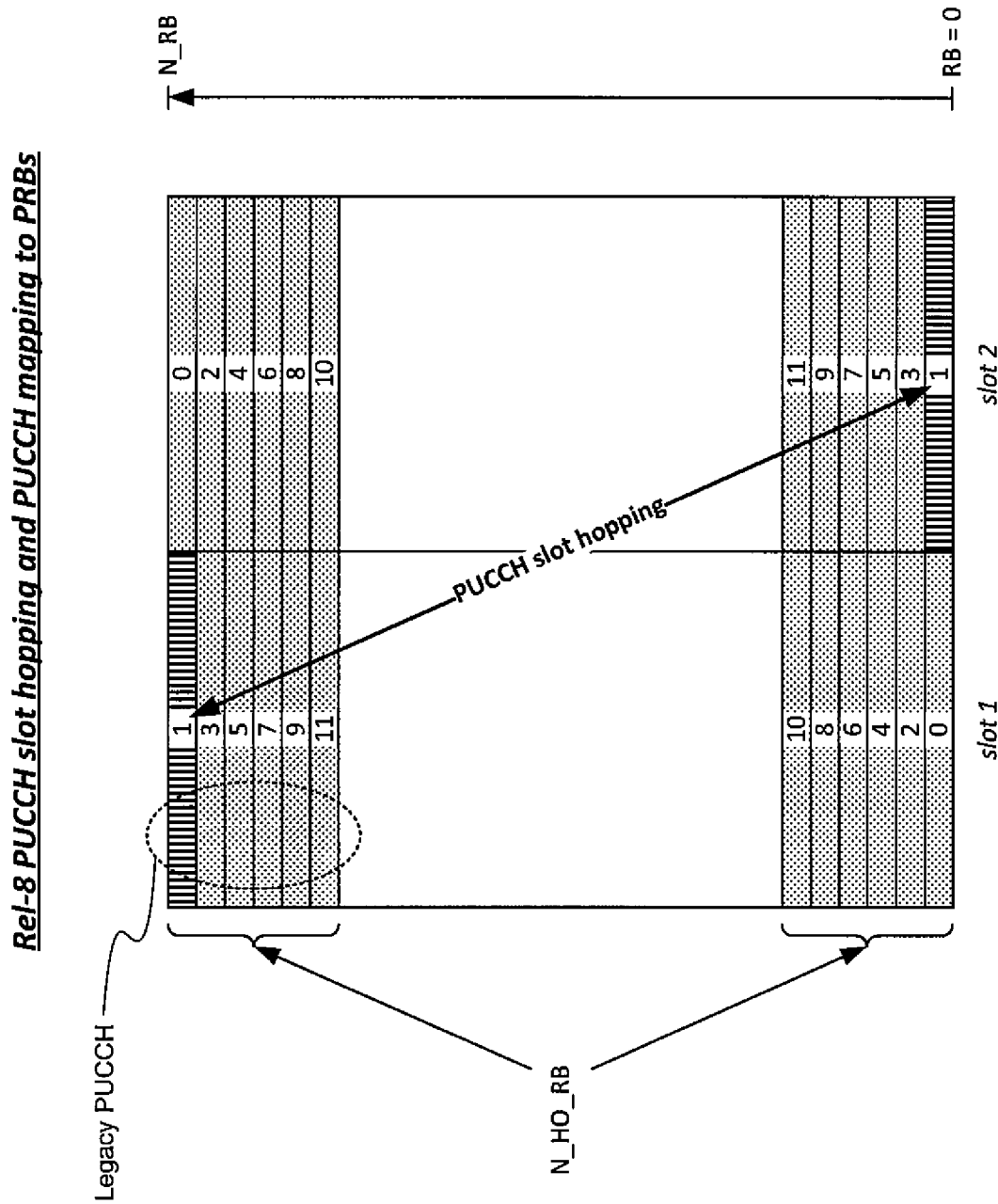

[Fig. 5]
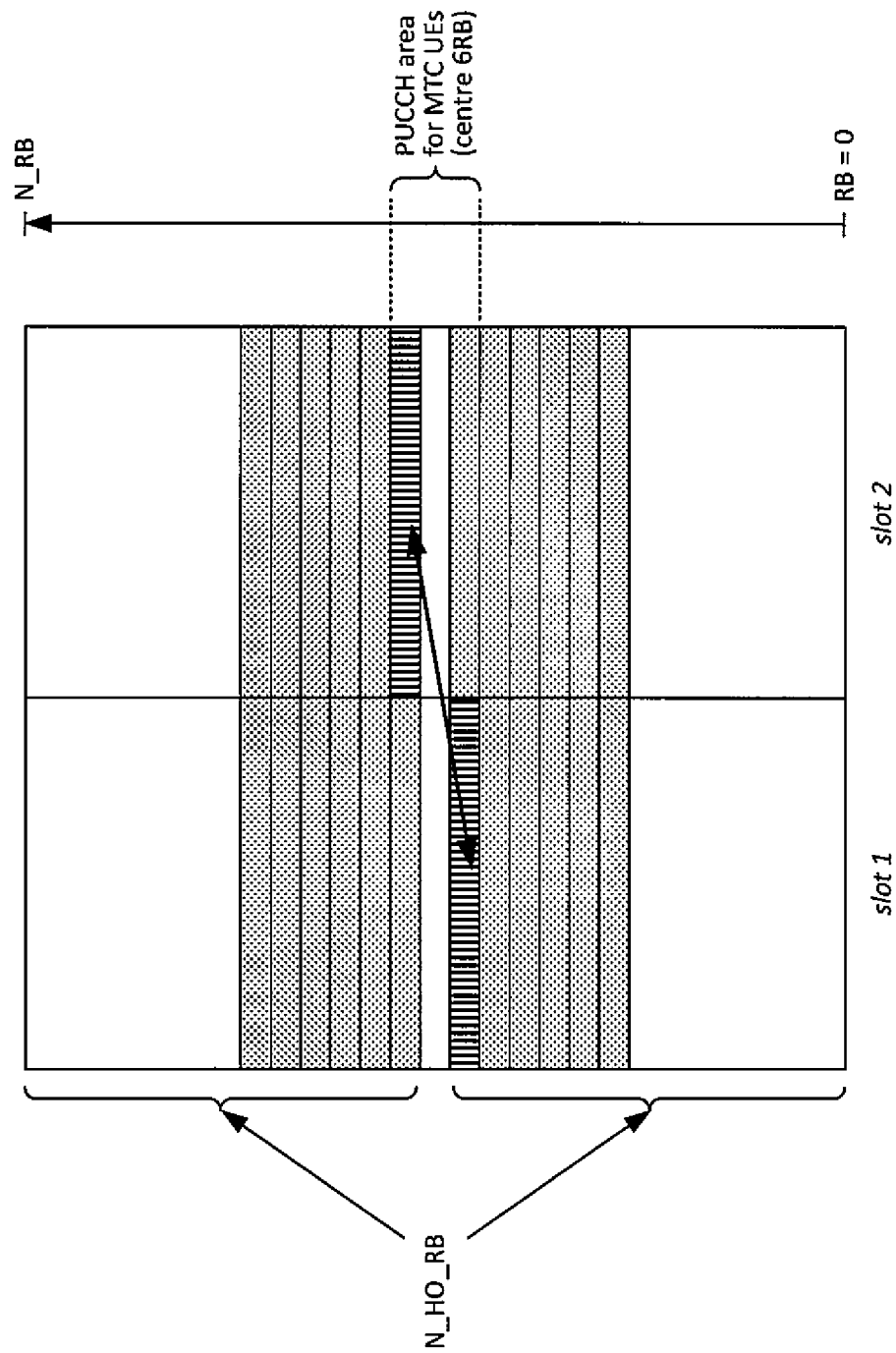

[Fig. 6]
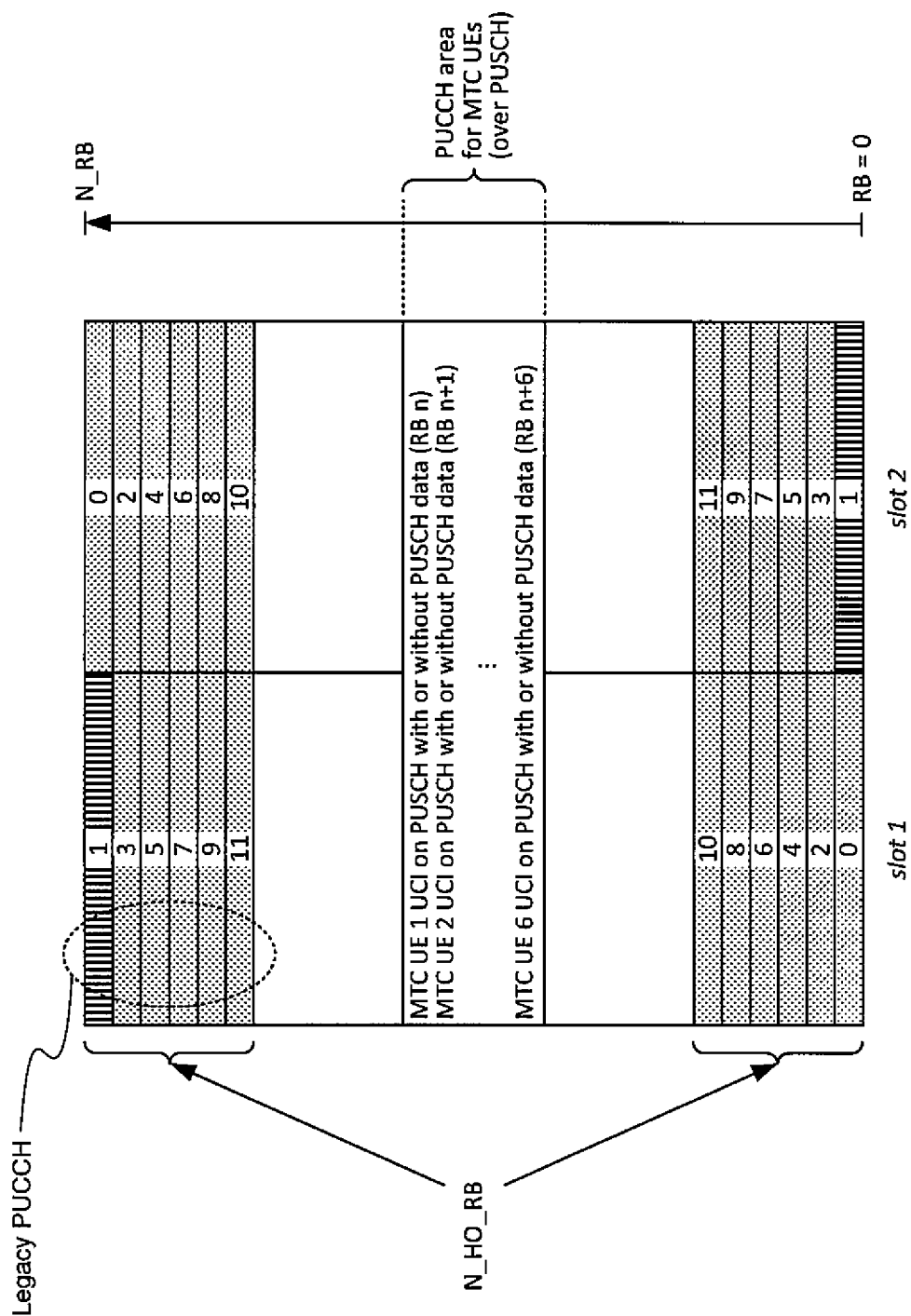

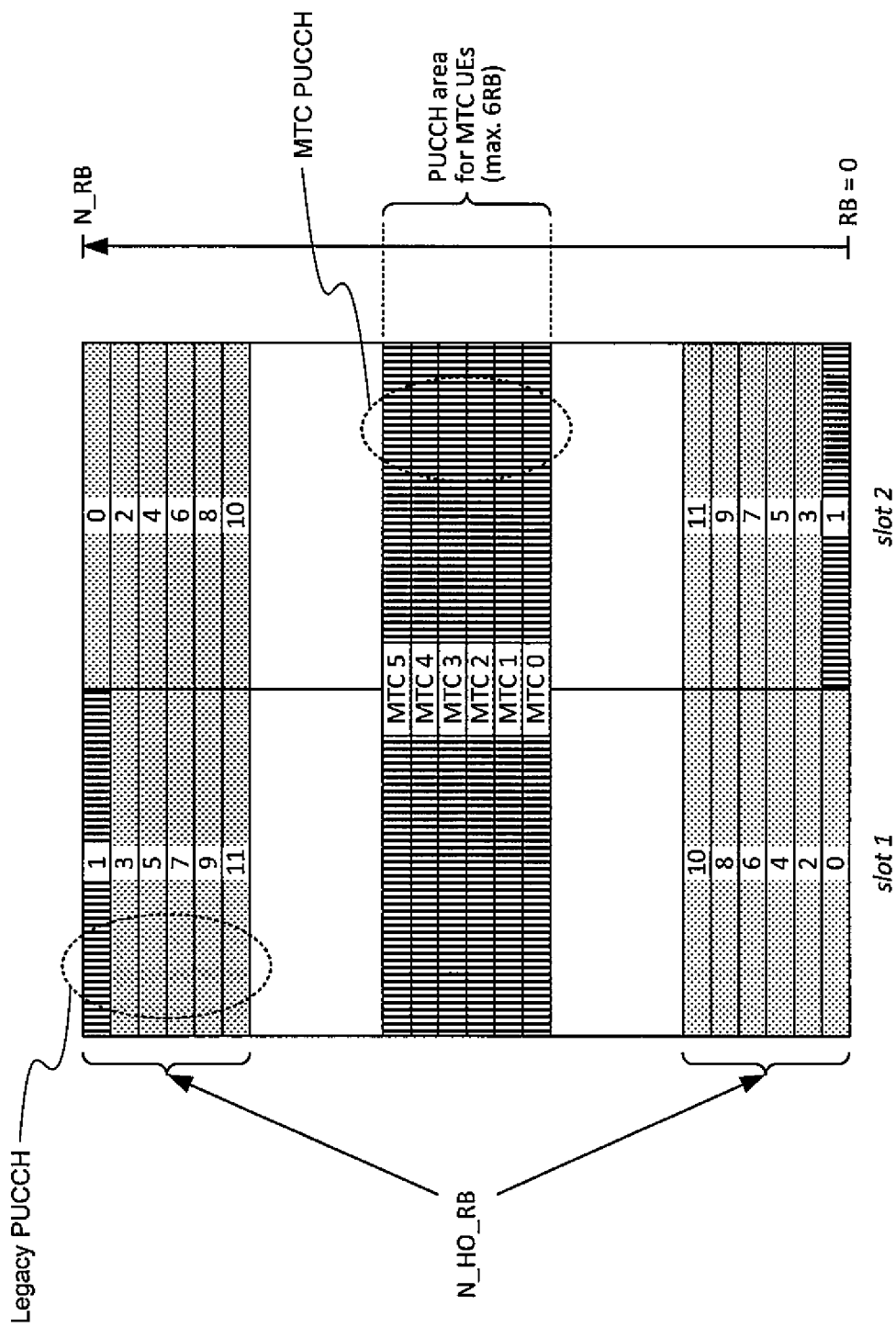
[Fig. 7]

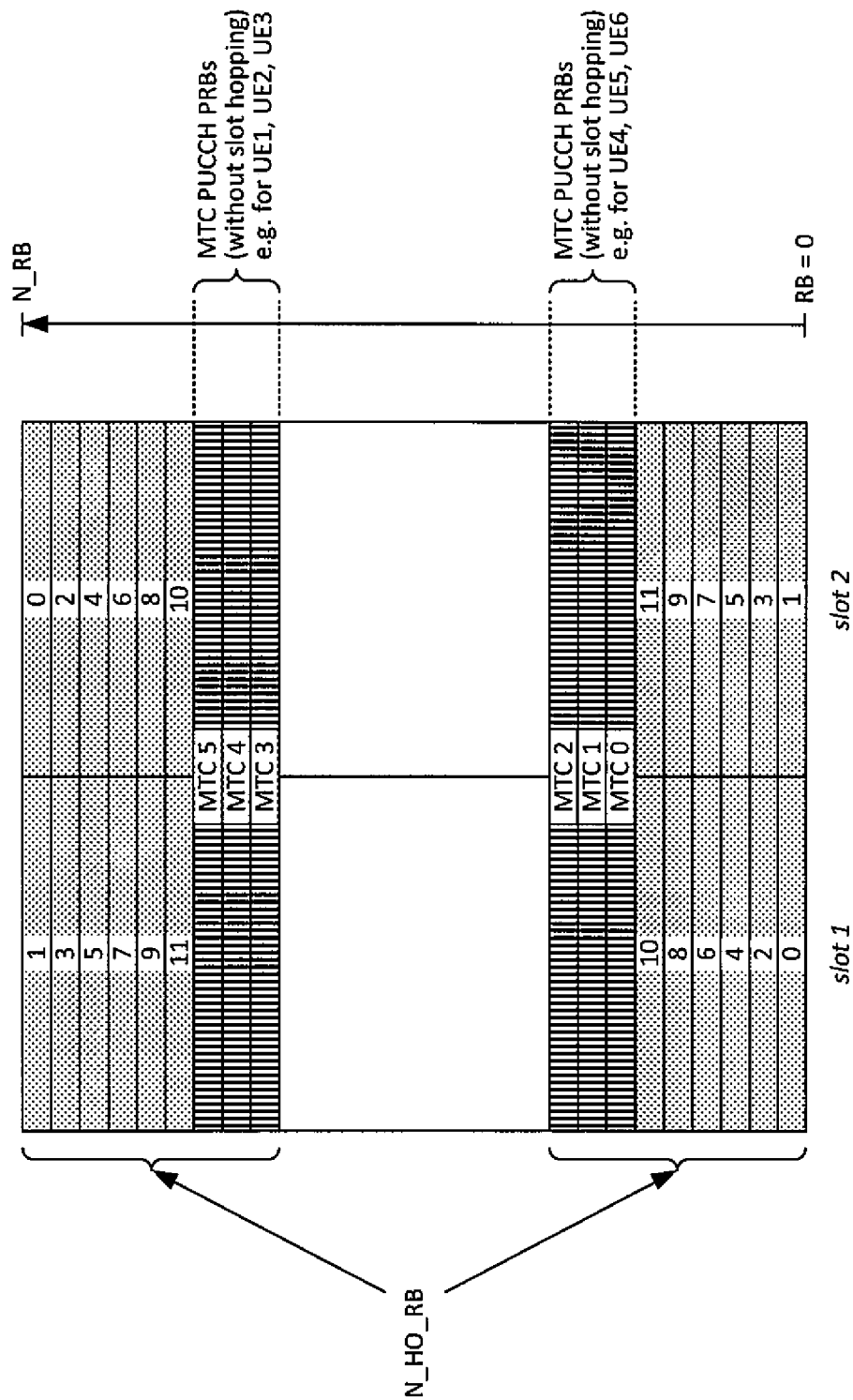

[Fig. 9]
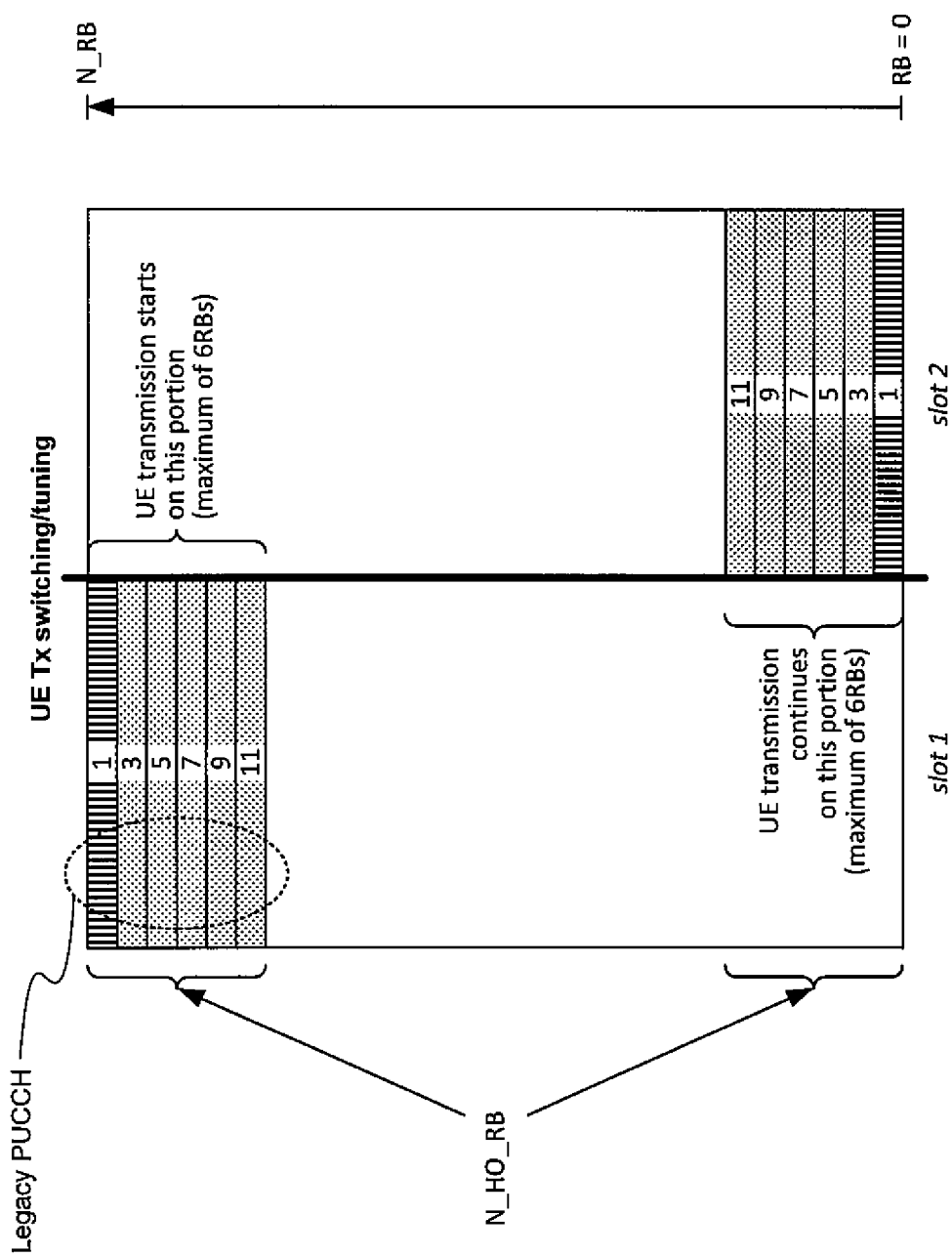

[Fig. 10]
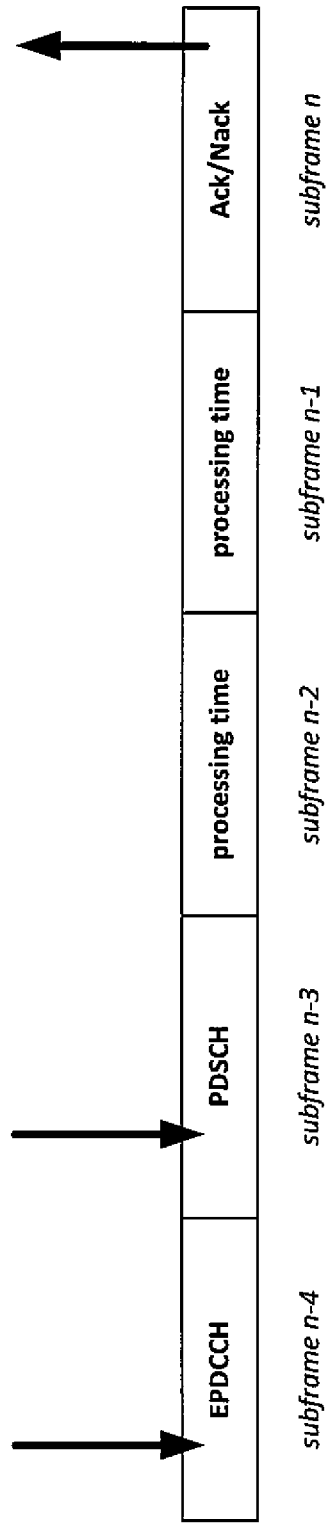

[Fig. 11]
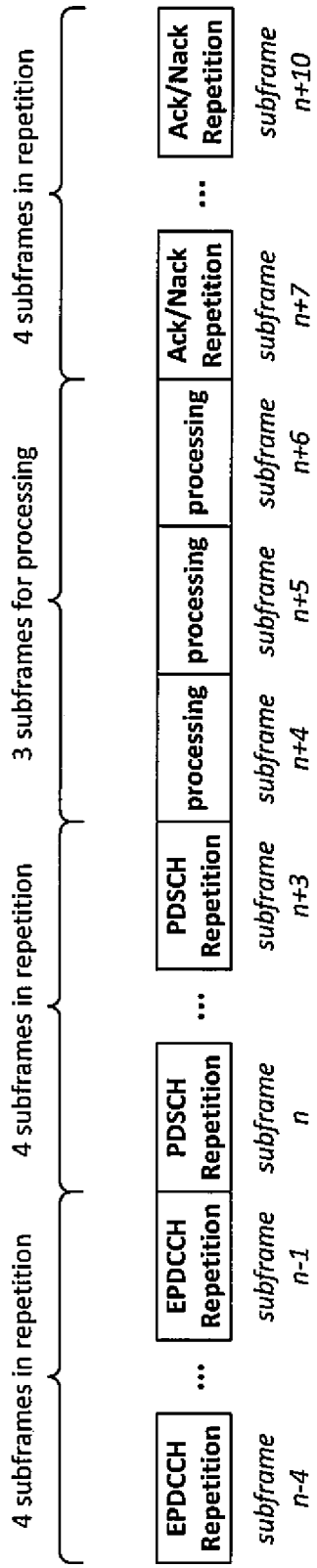

COMMUNICATION SYSTEM

This application is a National Stage Entry of PCT/JP2015/004690 filed on Sep. 15, 2015, which claims priority from United Kingdom Patent Application 1416796.9 filed on Sep. 23, 2014, the contents of all of which are incorporated herein by reference, in their entirety.

TECHNICAL FIELD

The present invention relates to mobile communications devices and networks, particularly but not exclusively those operating according to the 3$^{rd}$ Generation Partnership Project (3GPP) standards or equivalents or derivatives thereof. The invention has particular although not exclusive relevance to the Long Term Evolution (LTE) of UTRAN (called Evolved Universal Terrestrial Radio Access Network (E-UTRAN)), including LTE-Advanced.

BACKGROUND ART

In a mobile (cellular) communications network, (user) communication devices (also known as user equipment (UE), for example mobile telephones) communicate with remote servers or with other communication devices via base stations. In their communication with each other, communication devices and base stations use licensed radio frequencies, which are typically divided into frequency bands and/or time blocks.

In order to be able to communicate via the base stations, communication devices need to monitor control channels operated by the base stations. One of these physical control channels, the so-called physical downlink control channel (PDCCH) carries control information for scheduling of downlink and uplink resources to individual communication devices. Physical downlink control (PDCCH) channels are transmitted on an aggregation of one or several consecutive control channel elements (CCEs). Scheduling is realised by the serving base station transmitting, over the PDCCH, a Downlink Control Information (DCI) to each communication device that has been scheduled resources in the current scheduling round. Downlink data that has been scheduled this way is transmitted over the so-called Physical Downlink Shared Channel (PDSCH) using the resources allocated by the DCI. The PDSCH resources associated with the PDCCH control information (DCI) are normally provided within the same subframe, albeit using different frequencies.

The so-called physical uplink control channel (PUCCH) carries, in the uplink from the communication device to the serving base station, information referred to as Uplink Control Information (UCI). The UCI includes, amongst others, the so-called Hybrid Automatic Repeat Request (HARQ) feedback which is generated by the communication device and sent to the serving base station in response to downlink data transmissions received over the resources specified by the DCI. The UCI may also include channel quality indication (CQI), although this is optional. Normally, PUCCH resources are allocated to each communication device such that each communication device has time for processing the received downlink data before sending an appropriate (HARQ) Ack/Nack. Typically, PUCCH resources are allocated in the fourth subframe following transmission of the corresponding downlink data over the PDSCH, leaving a total of three subframes for processing the received data and generating an Ack/Nack.

The more communication devices there are in a cell and the more data is communicated for these communication devices, the more control signalling and HARQ feedback needs to be transmitted. Therefore, the amount of resources allocated for the PUCCH may change in dependence on the number of communication devices served by the base station.

In the Rel-13 version of the LTE standards, it is envisioned that the PUCCH will be provided in accordance with the current (Rel-8 based) design. In particular, the current PUCCH design specifies, amongst others, that:

the PUCCH is located at an edge of the total available cell bandwidth and that PUCCH slot hopping can also be applied (slot hopping is a technique for improving frequency diversity by frequently alternating the location of the PUCCH physical resources between opposite edges of the cell bandwidth); and the number of physical resource blocks (PRBs) in a slot that is available for potential PUCCH transmission is configured by higher layer signalling using the 'pushHoppingOffset' parameter.

However, recent developments in telecommunications have seen a large increase in the use of machine-type communications (MTC) UEs which are networked devices arranged to communicate and perform actions without human assistance. Examples of such devices include smart meters, which can be configured to perform measurements and relay these measurements to other devices via a telecommunication network. Machine-type communication devices are also known as machine-to-machine (M2M) communication devices.

MTC devices connect to the network whenever they have data to send to or receive from a remote 'machine' (e.g. a server) or user. MTC devices use communication protocols and standards that are optimised for mobile telephones or similar user equipment. However, MTC devices, once deployed, typically operate without requiring human supervision or interaction, and follow software instructions stored in an internal memory. MTC devices might also remain stationary and/or inactive for a long period of time. The specific network requirements to support MTC devices have been dealt with in the 3GPP TS 22.368 standard, the contents of which are incorporated herein by reference.

SUMMARY OF INVENTION

Technical Problem

For the Release 13 (Rel-13) version of the standards relating to MTC devices, support for a reduced bandwidth of 1.4 MHz in downlink and uplink is envisaged. Thus, some MTC devices (referred to as 'reduced bandwidth MTC devices') will support only a limited bandwidth (typically 1.4 MHz) compared to the total LTE bandwidth and/or they may have fewer/simplified components. This allows such 'reduced bandwidth' MTC devices to be made more economically compared to MTC devices supporting a larger bandwidth and/or having more complicated components.

However, the inventors have realised that, since reduced bandwidth MTC devices cannot communicate over the entire cell bandwidth, it may not always be possible to schedule such reduced bandwidth MTC devices in Rel-13 using the current (Rel-8 based) PDCCH/PUCCH channel design, especially when PUCCH slot hopping is also employed in the cell.

Further, the lack of network coverage (e.g. when deployed indoors), in combination with the often limited functionality of MTC devices, can result in such MTC devices having a low data rate and therefore there is a risk of some messages or channels not being received by an MTC device. In order to mitigate this risk, it has been proposed to increase the coverage of the PDCCH (or enhanced PDCCH ('EPDCCH') in Rel-13) to support such MTC devices (e.g. corresponding to 20 dB for frequency division duplex (FDD) transmissions). To facilitate such enhanced coverage, each MTC device will need to inform its serving base station of the amount of coverage required (e.g. 5 dB/10 dB/15 dB/20 dB coverage enhancement) to allow the base station to adjust its control signalling appropriately.

Ideally, physical layer control signalling (such as (E)PD-CCH, PUCCH, and/or the like) and higher layer common control information (e.g. SIB, random access response (RAR), paging messages, and/or the like) exhibit a high level of commonality between solutions for reduced bandwidth communication devices and solutions for coverage enhanced communication devices.

However, it is presently not known how to support reduced bandwidth MTC devices whilst also ensuring that an appropriate coverage enhancement can be provided when scheduling coverage enhanced MTC devices.

Solution of Problem

The present invention seeks to provide systems, devices and methods which at least partially address the above issues.

In an exemplary aspect of the invention, there is provided a communication apparatus which is operable to communicate with at least one of a first type mobile station and a second type mobile station, the communication apparatus including: a means for assigning a first frequency resource for a first uplink control channel of the first type mobile station per slot; and a means for assigning a second frequency resource for a second uplink control channel of the second type mobile station per a set of subframe.

In another exemplary aspect of the invention, there is provided a mobile station which is operable to communicate with a communication apparatus, the mobile station including: a means for determining first frequency resource which is assigned for a first uplink control channel per a set of subframe; and a means for transmitting the uplink control channel based on the first frequency resource.

In another exemplary aspect of the invention, there is provided a method performed by a communication apparatus which is operable to communicate with at least one of a first type mobile station and a second type mobile station, the method including: assigning a first frequency resource for a first uplink control channel of the first type mobile station per slot; and assigning a second frequency resource for a second uplink control channel of the second type mobile station per a set of subframe.

In another exemplary aspect of the invention, there is provided a method performed by a mobile station which is operable to communicate with a communication apparatus, the method including: determining first frequency resource which is assigned for a first uplink control channel per a set of subframe; and transmitting the uplink control channel based on the first frequency resource.

Aspects of the invention extend to corresponding systems, methods, and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

Embodiments of the invention will now be described by way of example only with reference to the attached figures in which:

FIG. 1 schematically illustrates a telecommunication system to which embodiments of the invention may be applied;

FIG. 2 is a block diagram illustrating the main components of the communication device shown in FIG. 1;

FIG. 3 is a block diagram illustrating the main components of the base station shown in FIG. 1;

FIG. 4 illustrates an exemplary way in which an MTC specific physical uplink control channel can be provided in the system shown in FIG. 1;

FIG. 5 illustrates an exemplary way in which an MTC specific physical uplink control channel can be provided in the system shown in FIG. 1;

FIG. 6 illustrates an exemplary way in which an MTC specific physical uplink control channel can be provided in the system shown in FIG. 1;

FIG. 7 illustrates an exemplary way in which an MTC specific physical uplink control channel can be provided in the system shown in FIG. 1;

FIG. 8 illustrates an exemplary way in which an MTC specific physical uplink control channel can be provided in the system shown in FIG. 1;

FIG. 9 illustrates an exemplary way in which an MTC specific physical uplink control channel can be provided in the system shown in FIG. 1;

FIG. 10 illustrates an exemplary way in which an MTC specific physical uplink control channel can be provided in the system shown in FIG. 1; and FIG. 11 illustrates an exemplary way in which an MTC specific physical uplink control channel can be provided in the system shown in FIG. 1.

DESCRIPTION OF EMBODIMENTS

<Overview>

FIG. 1 schematically illustrates a mobile (cellular) telecommunication system 1 in which communication devices 3 (such as mobile telephone 3-1 and MTC device 3-2) can communicate with each other and/or with other communication nodes via an E-UTRAN base station 5 (denoted 'eNB') and a core network 7. As those skilled in the art will appreciate, whilst one mobile telephone 3-1 one MTC device 3-2 and one base station 5 are shown in FIG. 1 for illustration purposes, the system, when implemented, will typically include other base stations and communication devices.

The base station 5 is connected to the core network 7 via an S1 interface. The core network 7 includes, amongst others: a gateway for connecting to other networks, such as the Internet and/or to servers hosted outside the core network 7 a mobility management entity (MME) for keeping track of the locations of the communication devices 3 (e.g. the mobile telephone and the MTC device) within the communication network 1; and a home subscriber server (HSS) for storing subscription related information (e.g. information identifying which communication device 3 is configured as a machine-type communication device) and for storing control parameters specific for each communication device 3.

The base station 5 is configured to provide a number of control channels, including, for example, a physical downlink control channel (PDCCH) and a physical uplink control channel (PUCCH). The PDCCH is used by the base station 5 for allocating resources to the communication devices 3 (typically by sending a UE-specific DCI to each communication device that has been scheduled in the current scheduling round). The PUCCH is used by the communication devices 3 for sending a UE-specific UCI to the base station (e.g. an appropriate HARQ Ack/Nack corresponding to downlink data received using the resources allocated by the DCI).

Each communication device 3 may fall into one or more of categories of UEs. A first category of UEs include communication devices that support only an earlier release of the LTE standard (e.g. Rel-8, Rel-9, Rel-10, Rel-11, and/or Rel-12). Such group of communication devices are commonly referred to as legacy UEs (assuming that the base station 5 is operating in accordance with Rel-13 of the LTE standards). A second category of UEs include reduced bandwidth UEs (e.g. Rel-13 MTC devices capable of using a 1.4 Mhz bandwidth only), which are not able to communicate over the entire bandwidth available in the cell of the base station 5. A third category of UEs includes coverage enhanced UEs (e.g. some MTC devices), which require certain base station functionalities to be simplified and/or relaxed (although such coverage enhanced UEs may support other functionalities as normal).

Beneficially, in order to support reduced bandwidth MTC devices, respective reduced bandwidth MTC specific PUCCH resources are configured for each MTC device in such a way that the PUCCH resources used in a first slot in the time domain (e.g. the first slot of a subframe) and the PUCCH resources used in a second slot in the time domain (e.g. the second slot of the subframe) are limited to being transmitted within the reduced bandwidth (typically 1.4 MHz) supported by the reduced bandwidth MTC device even where slot-to-slot hopping is employed, in which the frequency position of the PUCCH resources in the second slot effectively mirrors the frequency position of the PUCCH resources in the first slot, around the centre of the cell bandwidth.

A number of specific embodiments are described in which this is achieved. In one embodiment, for example, this is achieved by 'over-provisioning' the PUCCH such that the PUCCH resources available for scheduling to MTC devices include resources that extend from the upper and lower frequencies of the cell bandwidth into a central portion of the cell bandwidth that is smaller than the bandwidth of the reduced bandwidth MTC device. For example the central portion may have a bandwidth no greater than six adjacent resource blocks (~1.08 MHz) which is less than the typical 1.4 MHz bandwidth of a reduced bandwidth MTC device. Beneficially, in this embodiment each category of communication devices can be allocated PUCCH resources within the same PUCCH and in the same manner (i.e. with an appropriate slot hopping).

In another embodiment, for example, this is achieved by allocating resources (a maximum of six adjacent resource blocks) for the MTC devices to transmit PUCCH control information in a shared channel that does not employ slot hopping. For example, 'PUCCH' control information may be transmitted using the resources of the physical uplink shared channel (PUSCH). Therefore, effectively, the MTC devices may be configured to transmit their PUCCH signalling using shared resources (e.g. PUSCH), rather than dedicated resources (e.g. conventional, or legacy, PUCCH). Beneficially, in this embodiment there is no need to 'over-provision' the conventional PUCCH to account for the MTC devices (which typically communicate less frequently, and hence they need to send fewer PUCCH signalling, than other types of communication devices).

In yet another embodiment, for example, this is achieved by providing a separate, MTC specific, PUCCH channel near a central portion of the cell bandwidth that is smaller than the bandwidth of the reduced bandwidth MTC device (and that is separated from the legacy PUCCH that extends from the edges of the cell bandwidth). For example, such a separate, MTC specific, PUCCH channel may be provided over the central portion having a bandwidth no greater than six adjacent resource blocks (~1.08 MHz). One benefit of this embodiment is that there is no need to share the MTC PUCCH resources with the resources normally used for the uplink shared channel communications.

In yet another embodiment, for example, this is achieved by allocating a set of resources forming part of a convention (legacy) PUCCH region to MTC devices and disabling slot hopping in that set of resources. One benefit of this embodiment is that PUCCH resources may be provided near the edges of the cell bandwidth for each category of communication devices.

In yet another embodiment, for example, this is achieved by configuring the MTC devices to transmit, in a first slot, their PUCCH signalling using part of the legacy PUCCH resources, at the upper or lower edges of the cell bandwidth, that is smaller than the bandwidth of the reduced bandwidth MTC device. In this case, rather than performing conventional slot hopping in which the PUCCH resources used in the second slot are at a frequency position that mirrors the frequency position of the PUCCH resources in the first slot, the MTC devices are configured to apply time division multiplexing techniques in order to maintain the benefit of frequency diversity otherwise provided by slot hopping. Specifically, after completing its PUCCH transmission in the first slot, but prior to transmitting in the second slot, the MTC device is configured to switch/re-tune its (reduced bandwidth) transceiver to move its operational frequency band to a position that mirrors, around the centre of the cell bandwidth, the position of the operational frequency band used in the first slot. Once the MTC device has completed switching/re-tuning its transceiver, it continues its PUCCH transmission in the second slot at a frequency position (within the entire cell bandwidth) that may (but doesn't have to) mirror, around the centre of the cell bandwidth, the frequency position (within the entire cell bandwidth) used in the first slot.

Advantageously, the provision of such MTC specific PUCCH resources in accordance with any of the above embodiment does not affect the provision of PUCCH resources for legacy communication devices, because there is no need for the base station to change the way its legacy PUCCH is provided.

In summary, the PUCCH is beneficially configured in the cell of the base station 5 in such a way that different categories of communication devices are allocated different types of PUCCH resources. Therefore, legacy communication devices may be allocated resources in a conventional (Rel-8 based) PUCCH, whilst MTC devices may be allocated resources in the MTC specific PUCCH (in a portion of the cell bandwidth that is smaller than the bandwidth of the reduced bandwidth MTC device).

Therefore, it is possible to support MTC devices (especially reduces bandwidth MTC devices) without sacrificing the backward compatibility and/or without having to limit the PUCCH bandwidth to 1.4 MHz. Further, it is also possible to support PUCCH slot hopping for compatible communication devices and thereby benefit from frequency diversity.

Beneficially, in order to provide the required commonality between solutions for reduced bandwidth MTC devices and the solutions for coverage enhanced MTC devices, in each of the embodiments summarised above, the reduced bandwidth MTC PUCCH techniques can also be applied for coverage enhanced MTC devices. Unlike the reduced bandwidth MTC device, however, in the case of coverage enhanced MTC devices every relevant channel (e.g. comprising the PDSCH, PUCCH and the PRACH as well as the EPDCCH) is repeated in multiple subframes where the number of repetitions depends on the level of coverage enhancement.

<Communication Device>

FIG. 2 is a block diagram illustrating the main components of the communication device 3 shown in FIG. 1. The communication device 3 may be an MTC device or a mobile (or 'cellular') telephone configured as a machine-type communication device. The communication device 3 comprises a transceiver circuit 31 which is operable to transmit signals to, and to receive signals from, the base station 5 via at least one antenna 33. Typically, the communication device 3 also includes a user interface 35 which allows a user to interact with the communication device 3, however this user interface 35 may be omitted for some MTC devices.

The operation of the transceiver circuit 31 is controlled by a controller 37 in accordance with software stored in memory 39. The software includes, among other things, an operating system 41, a communication control module 43, and an MTC module 45.

The communication control module 43 controls communications between the communication device 3 and the base station 5 and/or other communication nodes (via the base station 5). As shown in FIG. 2, the communication control module 43 includes, amongst others, an EPDCCH module portion (for managing communications over the enhanced physical downlink control channel), a PDSCH module portion (for managing communications over the physical downlink shared channel), and a PUCCH module portion (for managing communications over the physical uplink control channel).

The MTC module 45 is operable to carry out machine-type communication tasks. For example, the MTC module 45 may (e.g. periodically) receive data from a remote server (via the transceiver circuit 31) over resources allocated to the MTC device 3 by the base station 5. The MTC module 45 may also collect data for sending (e.g. periodically and/or upon detecting a trigger) to a remote server (via the transceiver circuit 31).

<Base Station>

FIG. 3 is a block diagram illustrating the main components of the base station 5 shown in FIG. 1. The base station 5 comprises an E-UTRAN base station (eNB) comprising a transceiver circuit 51 which is operable to transmit signals to, and to receive signals from, the communication devices 3 via one or more antennas 53. The base station 5 is also operable to transmit signals to and to receive signals from a core network 7 via an appropriate core network interface 55 (such as an S1 interface). The operation of the transceiver circuit 51 is controlled by a controller 57 in accordance with software stored in memory 59.

The software includes, among other things, an operating system 61, a communication control module 63, and a UE category determination module 65.

The communication control module 53 controls communications with the communication devices 3 (including any MTC devices). The communication control module 53 is also responsible for scheduling the resources to be used by the communication devices 3 served by this base station 5. As shown in FIG. 3, the communication control module 63 includes, amongst others, an EPDCCH module portion (for managing communications over the enhanced physical downlink control channel), a PDSCH module portion (for managing communications over the physical downlink shared channel), and a PUCCH module portion (for managing communications over the physical uplink control channel).

The UE category determination module 65 determines the category of the communication devices 3 served by the base station 5, based on, for example, information obtained from the communication devices 3 and/or from another network node (e.g. the HSS). When appropriate, the UE category determination module 65 provides information identifying the category of each served communication devices to the other modules, e.g. the communication control module 53, so that the other modules can adjust their operation accordingly.

In the above description, the communication device 3 and the base station 5 are described for ease of understanding as having a number of discrete modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

The following is a description of various ways in which the physical uplink control channel may be provided in LTE systems.

<PUCCH design in Rel-8>

FIG. 4 illustrates an exemplary way in which PUCCH mapping to PRBs and PUCCH slot hopping may be performed in accordance with the PUCCH design for Rel-8 of LTE. It will be appreciated that this PUCCH design (which is also referred to as 'legacy PUCCH') is not limited to Rel-8 LTE systems and it is also used in later versions of the LTE standards (e.g. Rel-9 to Rel-12) for backward compatibility with user equipment supporting only the Rel-8 version of LTE.

The bandwidth of the cell comprises a number ('N_RB') of physical resource blocks (i.e. cell resource blocks #0 through #N_RB shown in FIG. 4, where 'N_RB' denotes the total number of physical resource blocks per slot). As explained above, the PUCCH is typically located at (or near) the edges of the available cell bandwidth. The number of physical resource blocks in a slot for potential PUCCH transmission is configured by higher layer signalling using the 'push-HoppingOffset' parameter (denoted 'N_HO_RB' in FIG. 4). It will be appreciated that the value of the 'push-HoppingOffset' parameter depends on the number of communication devices served by the base station in its cell. In the example shown in FIG. 4, N_HO_RB=12, i.e. the PUCCH in this example includes a total of twelve resource blocks (six at each edge of each slot). Therefore, a total of twelve resource blocks are allocated for the PUCCH (although not all of these resource blocks are necessarily used in every slot, since in each subframe the actual number of resource blocks used depends on the number of communication devices scheduled in that particular subframe). The 'push-HoppingOffset' parameter may be signalled to the UEs using RRC configuration signalling.

It will be appreciated that such a legacy PUCCH area may be provided near an edge of the slots such that it does not exceed the 1.4 MHz bandwidth limit supported by some of the MTC devices. For example, in the scenario shown in FIG. 4, the six neighbouring resource blocks near either edge of the cell bandwidth correspond to such a 1.4 MHz bandwidth (or less). Therefore, a limited bandwidth MTC device would be able to transmit signals over either the top 'legacy PUCCH' area or the bottom 'legacy PUCCH' area (but not both areas) and even if the value of N_HO_RB does exceed '6', the MTC device will only transmit maximum 6 RBs that contains it PUCCH part in any given subframe.

However, in accordance with Rel-8 PUCCH design, PUCCH slot hopping is also applied in order to improve frequency diversity in the cell. Therefore, as indicated in FIG. 4 by a diagonal arrow for PUCCH resource block #1, the location of each PUCCH resource block is alternating between the two opposite edges of the cell bandwidth between two slots (i.e. PUCCH resource block #1 is provided via cell resource block #N_RB in slot 1 and via cell resource block #0 in slot 2).

Consequently, a reduced bandwidth MTC device (such as the MTC device 3-2 of FIG. 1) having a typical bandwidth of 1.4 MHz may not be able to communicate (e.g. transmit signals) at both ends of the cell bandwidth in a particular subframe. Therefore, in case of the scenario shown in FIG. 4, such an MTC device transmits its scheduled PUCCH control information at both resource blocks #0 (in slot 1) and #N_RB (in slot 2)—although the MTC device may be able to switch from one 1.4 MHz portion to a different 1.4 MHz portion of the cell bandwidth from one subframe to another.

This issue may be overcome by employing one or more of the following PUCCH design options A to G (described with reference to FIGS. 5 to 10 below), whilst also maintaining backward compatibility with communication devices supporting the legacy (Rel-8 based) PUCCH.

It will be appreciated that these options are not mutually exclusive and any of the options A to G may be combined within the same system, either within a single cell and/or in neighbouring cells. For example, the base station 5 may be configured to change from one PUCCH configuration to another, e.g. periodically, in dependence on the number of MTC devices 2 in its cell, in dependence on the overall load in the cell, and/or the like.

<Operation—Option A>

FIG. 5 illustrates an exemplary way in which an MTC specific physical uplink control channel can be provided in the system shown in FIG. 1.

This embodiment is based on the concept of over-provisioning the PUCCH. Such over-provisioning can be realised by the base station 5 selecting (using its PUCCH module portion) the value of the 'push-HoppingOffset' parameter (denoted 'N_HO_RB' in FIG. 5) such that it is large enough to include (at least some of) the physical resource blocks located near the centre six cell resource blocks. Advantageously, in this case an MTC specific PUCCH area may be provided over (some of) the centre six physical resource blocks from among the cell resource blocks #0 to #N_RB (i.e. over a bandwidth not exceeding 1.4 MHz). Therefore, even if PUCCH slot hopping is enabled in the cell, the PUCCH resources allocated to MTC device alternate between physical resource blocks that are located within a 1.4 MHz bandwidth.

Advantageously, the provision of an MTC specific PUCCH area in this manner does not affect the provision of a legacy (Rel-8 based) PUCCH since the range of physical resource blocks used for the PUCCH are defined, starting from the edges of each slot, by the 'N_HO_RB' parameter. Therefore, a sufficient level of frequency diversity may be maintained for compatible communication devices by allocating resource blocks from within such an over-provisioned PUCCH area but closer to the edges of the slots (e.g. outside the centre six physical resource blocks).

It will be appreciated that the base station 5 may be configured to obtain (using its UE category determination module 65) information identifying whether a particular communication device (e.g. the MTC device 3-2) comprises a machine-type communication device and/or functionality. The base station 5 may obtain such information, for example, from the HSS and/or from the communication device itself. The base station 5 may also be configured to obtain information identifying whether a particular MTC device comprises a reduced bandwidth MTC device or a coverage enhanced MTC device. Therefore, based on the obtained information, the base station 5 can allocate (using its PUCCH module portion) appropriate PUCCH resources: i) to MTC devices (at least reduced bandwidth MTC devices or, optionally, to all MTC devices) in the MTC specific PUCCH area comprising the centre six physical resource blocks; and to other communication devices (e.g. regular mobile telephones and/or coverage enhanced MTC devices) outside the centre six physical resource blocks (preferably near the edges of the slots if frequency diversity is required).

It will be appreciated that since Rel-13 MTC devices are expected to support applications with very small data rates (i.e. small pay loads), there is no need for such MTC devices to support the so-called Multiple Input Multiple Output (MIMO) technique (and/or to have multiple antennas). This may in turn reduce the processing complexity and power consumption of such MTC devices. Further, for Rel-13 MTC devices it is sufficient for the base station 5 to transmit a single transport block in the downlink which will only require a single Ack/Nack (in a single UCI) to be conveyed in the uplink PUCCH channel, further reducing the complexity of the required MTC specific PUCCH.

In addition, there is also no need to obtain CQI feedback from the MTC devices because of their narrow (1.4 MHz) supported bandwidth. Therefore, it will be appreciated that only PUCCH Format 1 and 1a would be needed for MTC devices in Rel-13 (i.e. PUCCH Formats 1b/2/2a/2b/3 may not be needed).

<Operation—Option B>

FIG. 6 illustrates another exemplary way in which an MTC specific physical uplink control channel can be provided in the system shown in FIG. 1.

This embodiment is based on the concept of carrying the PUCCH control signalling (for MTC devices) over the PUSCH channel. Specifically, the PUSCH in this example is provided near the centre portion of the physical resource blocks used in the cell of the base station 5 (e.g. near the centre six (or fewer) cell resource blocks). However, rather than carrying only shared uplink signalling, the PUSCH in this embodiment is adapted to carry the PUCCH control signalling for MTC devices. Therefore, in this example, there is no need for over-provisioning the PUCCH (i.e. a legacy PUCCH, preferably with slot hopping enabled, can be provided for non-MTC communication devices without the base station 5 having to select a large 'N_HO_RB' value).

Beneficially, even if PUCCH slot hopping is enabled in the cell for legacy (non-MTC) communication devices, the PUCCH resources allocated to MTC device remain unaffected and/or can alternate between physical resource blocks of the PUSCH that are located within a 1.4 MHz bandwidth (around the centre of the cell bandwidth).

In practice, this option means that either the control information (e.g. UCI) sent by the MTC devices needs to be multiplexed with the data normally transmitted over the PUSCH or the PUSCH resource blocks allocated to MTC devices only carry the control information (UCI). It will be appreciated that it is possible to send information on the PUSCH without any scheduled uplink data (UL-SCH), for example, as specified in section 5.2.4 of 3GPP TS 36.212, and in sections 8.6.1 and 8.6.2 of TS 36.213, the contents of which are incorporated herein by reference. This technique may be extended to enable MTC devices to send the control information (e.g. UCI) without multiplexing it with other PUSCH data.

If the control information sent by a particular MTC device is being multiplexed with PUSCH data, then the base station 5 may be configured to allocate (using its communication control module 63) the uplink physical resource block for a given MTC device using the uplink grant control data that schedules the PUSCH data (that is to be multiplexed with that MTC device's control information).

If the control information by a particular MTC device is transmitted on the PUSCH without scheduling any PUSCH data (i.e. without multiplexing), then the number of the uplink physical resource blocks for a given MTC device that will carry the associated control information can be given in a number of ways, for example, including:

indicated dynamically by the uplink grant mechanism (e.g. using an appropriate DCI format) that is normally used for scheduling PUSCH data;

configured by RRC signalling (e.g. semi-statically); and/or based on a semi-persistent scheduling (SPS) allocation (i.e. the physical resource block to be used by a given MTC device may be configured for the MTC device by an appropriate SPS configuration).

<Operation—Option C>

FIG. 7 illustrates another exemplary way in which an MTC specific physical uplink control channel can be provided in the system shown in FIG. 1.

In this example, the base station 5 provides an MTC specific PUCCH. It will be appreciated that, for backward compatibility, such an MTC specific PUCCH may be provided in addition to a regular, legacy PUCCH (defined by 'N_HO_RB') provided at the edges of the slots.

As shown in FIG. 7, the MTC specific PUCCH is provided over a maximum of six physical resource blocks (i.e. over a bandwidth not exceeding 1.4 MHz) near the centre of the range of physical resource blocks #0 to #N_RB of the cell. The MTC specific PUCCH area includes MTC resources #0 to 5, which may be used by a maximum of six MTC devices per scheduling round. However, since the MTC devices are typically transmitting small bursts of data, each MTC resource #0 to 5 may be re-allocated to a different MTC device in a subsequent scheduling round.

It will be appreciated that, if appropriate, such an MTC specific PUCCH may be provided solely for the use of MTC devices (e.g. Rel-13 reduced bandwidth MTC devices) even without slot hopping enabled (i.e. without backward compatibility). In this case, it will be appreciated that each MTC device may be scheduled to transmit, in both slots, using the same six resource blocks that contain the PUCCH information for that MTC device.

If appropriate (e.g. when slot hopping is not used), it will also be appreciated that the MTC specific PUCCH may also be provided closer to (or even adjacent to) the legacy PUCCH rather than at the centre area (as shown in FIG. 7).

<Operation—Option D>

FIG. 8 illustrates yet another exemplary way in which an MTC specific physical uplink control channel can be provided in the system shown in FIG. 1.

Effectively, option D can be seen as a modification of option C. However, in this case the MTC specific PUCCH is provided as part of the legacy PUCCH rather than adjacent to it.

Therefore, when the base station 5 configures (using its PUCCH module portion) the value of the 'push-Hopping-Offset' parameter (denoted 'N_HO_RB' in FIG. 8), the base station selects the value such that it also includes (a maximum of) six physical resource blocks located immediately after the legacy PUCCH area (provided at the edges) towards the centre of the slots. In the example shown in FIG. 8 there are three-three MTC specific PUCCH resource blocks allocated next to both portions of the legacy PUCCH provided at the lower and upper edges of the slots (although it is possible to provide up to six MTC specific PUCCH resource blocks next to each portion of the legacy PUCCH, i.e. not exceeding 1.4 MHz).

It will be appreciated that whilst in the legacy PUCCH area slot hopping may be supported (for frequency diversity), the MTC specific PUCCH is provided without slot hopping enabled in order to ensure compatibility with Rel-13 reduced bandwidth MTC devices (and/or similar). Therefore, regardless whether or not PUCCH slot hopping is enabled in the cell for legacy devices, the PUCCH resources allocated to MTC devices remain within the same resource block (and/or alternate only within the same 1.4 MHz bandwidth) in both slots.

<Operation—Option E>

FIG. 9 illustrates yet another exemplary way in which an MTC specific physical uplink control channel can be provided in the system shown in FIG. 1.

In this example, only a legacy PUCCH is configured by the 'push-HoppingOffset' parameter (denoted 'N_HO_RB' in FIG. 9). However, in this case the MTC device is configured to transmit over its allocated PUCCH resource block in a time division multiplexing (TDM) manner. In other words, as illustrated in FIG. 9, the base station 5 allocates (using its PUCCH module portion) a PUCCH resource (e.g. PUCCH resource block #1 forming part of a legacy PUCCH) to the MTC device (denoted 'UE' in FIG. 9). However, rather than performing slot hopping between slot 1 and slot 2 (which would require a transceiver that is capable of simultaneously operating over the entire cell bandwidth), the MTC device transmits only a first part of its scheduled uplink data for the duration of slot 1. Then, after slot 1, the MTC device performs an appropriate switching and/or tuning if its transmitter (Tx) 31 to a frequency band covering the physical resource block in slot 2 corresponding to the PUCCH resource block #1 after slot hopping. After Tx switchin/tuning, the MTC device transmits the remaining part of its scheduled uplink data for the duration of slot 2.

It means that a reduced bandwidth MTC device (e.g. a Rel-13 MTC device) may be scheduled to transmit (using its transceiver circuit 31) over a maximum of six neighbouring resource blocks in the first slot (that contains the MTC device's corresponding PUCCH information) and then switch/tune its transceiver circuit 31 to the corresponding resource block(s) of the second slot.

As a modification of this embodiment, each physical resource block may be shared between two MTC devices. In other words, the base station 5 may allocate a PUCCH resource (e.g. PUCCH resource block #1) to a first MTC device for the duration of slot 1, and allocate the same PUCCH resource to a second MTC device for the duration of slot 2. In this case, there is no need for either MTC device to perform any Tx switching/tuning between slots 1 and 2 (although the MTC devices may need to suspend transmission for the duration of the slot in which the physical resource block is allocated to a different MTC device). However, since MTC devices normally transmit a relatively low amount of data, this modification may not have any significant drawback (and may even improve the MTC device's overall power consumption).

<Operation—Option F>

In accordance with the LTE FDD specifications for Rel-8, a communication device 3 needs to time its Ack/Nack transmissions (confirming successful/unsuccessful receipt of a downlink packet) as follows:

i) in subframe n−4, the communication device 3 receives (E)PDCCH control signalling (which indicates that downlink resources have been allocated to the communication device 3 for receiving downlink data) and detects associated PDSCH signalling (i.e. downlink data for the communication device 3);

ii) in subframe n−4, the communication device 3 receives the scheduled downlink data from the base station 5 via the PDSCH;

iii) in subframes n−3 to n−1, the communication device 3 processes the received downlink data; and iv) in subframe n, the communication device 3 transmits to the base station 5: an acknowledgement (HARQ-ACK) upon successful receipt of the PDSCH control signalling; or a negative acknowledgement (HARQ-NACK) upon unsuccessful receipt of the PDSCH control signalling.

In accordance with this timing method, the communication device 3 receives both the (E)PDCCH and the PDSCH in the same subframe (i.e. in subframe n−4) and the communication device 3 has a maximum of three subframes (i.e. from subframe n−3 to subframe n−1) to process the PDSCH control signalling before sending an appropriate HARQ Ack/Nack response to the base station 5.

However, in LTE Rel-13, MTC devices are not expected to be able to receive their EPDCCH and PDSCH signalling within the same subframe. This is because the EPDCCH and the PDSCH are not necessarily transmitted within the same 1.4 MHz bandwidth that the (reduced bandwidth) MTC devices are capable of using in that subframe. Therefore, in LTE Rel-13 the following options are envisaged for the timing the Ack/Nack transmissions by MTC devices for their PDSCH signalling:

1) No EPDCCH control signalling is transmitted in subframe n−4: In this case the MTC device detects its PDSCH control signalling in subframe n−4; and transmits a corresponding (HARQ) ACK/NACK in subframe n. Therefore, in this case the EPDCCH and the PDSCH signalling for the MTC device are not transmitted in the same subframe (as they would be in accordance with legacy, e.g. Rel-8 practices).

It will be appreciated therefore that uplink (PUCCH) resources for transmitting the Ack/Nack may be allocated to the MTC devices semi-statically (e.g. using higher layer signalling similar to the (Rel-8) SPS PUCCH resource allocation technique, which is illustrated in Table 9.2-2 of 3GPP TS 36.213). Alternatively, the EPDCCH control signalling may be transmitted in subframe n−5.

2) No PDSCH control signalling transmitted in subframe n−4: In this case (which is illustrated in FIG. 10) the MTC device detects its EPDCCH control signalling in subframe n−4; detects its PDSCH control signalling in subframe n−3 and transmits a corresponding (HARQ) ACK/NACK in subframe n. Beneficially, the base station 5 is not restricted in this case to transmit both the EPDCCH and the PDSCH over the same 1.4 MHz bandwidth that (reduced bandwidth) MTC devices are capable of using in a given subframe (although the MTC devices may need to switch from the EPDCCH frequency band to the PDSCH frequency band, if different, between subframes n−4 and n−3).

In this case therefore the time duration available for the MTC device to process the received PDSCH signalling is reduced to approximately two subframes (from three subframes in accordance with the above Rel-8 Ack/Nack transmission method). However, since a typical MTC device is not receiving large blocks of data, such a shortened processing time is expected to be sufficient.

<Operation—Option G>

Since in Rel-13 there expected to be a high level of commonality between the solutions for bandwidth reduced communication devices and coverage enhanced communication devices, it will be appreciated that the above described options may be applied for coverage enhanced MTC devices as well.

However, as illustrated in FIG. 11, in this case each relevant channel (for example, the EPDCCH, the PDSCH, the PUCCH, and/or the PRACH) is repeated in multiple subframes (i.e. in the time domain) and the information transmitted in each channel is combined by the MTC device in order to increase detectability of that channel.

FIG. 11 illustrates a modification of the embodiment shown in FIG. 10 (i.e. option F/2) in order to support (coverage enhanced) MTC devices when repetition of the relevant channels is enabled.

Specifically, in this case both the EPDCCH and the PDSCH are repeated by the base station 5. Similarly, the MTC device is configured to transmit an Ack/Nack for each repetition of the PDSCH signalling. However, there are only three subframes allocated for processing the received (repeated) PDSCH signalling and the MTC device is configured to send the corresponding Ack/Nack transmissions in successive subframes (i.e. without any additional subframes allocated for processing between two subsequent acknowledgements).

Therefore, as illustrated in FIG. 11 for a coverage enhancement requiring three repetitions (i.e. a total of four transmissions of the same information), the base station 5 transmits the same EPDCCH signalling in each of subframes n−4 to n−1 (a total of four subframes). Next, the base station 5 transmits the (same) PDSCH signalling in each of subframes n to n+3 (a total of four subframes). Subframes n+4 to n+6 (i.e. a total of three subframes) are allocated for the MTC device 3 for processing the received PDSCH signalling (i.e. to determine whether or not the downlink data was received successfully). Finally, in subframes n+7 to n+10 (a total of four subframes), the MTC device transmits the appropriate Ack/Nack to the base station in dependence on the result of the processing.

It will be appreciated that in this case the PUCCH resources (for transmitting the Ack/Nack) may be allocated to the MTC device semi-statically (e.g. using higher layer signalling similar to the (Rel-8) SPS PUCCH resource allocation technique shown in Table 9.2-2 of 3GPP TS 36.213).

<Modifications and Alternatives>

Detailed embodiments have been described above. As those skilled in the art will appreciate, a number of modifications and alternatives can be made to the above embodiments whilst still benefiting from the inventions embodied therein.

In some of the above embodiments, information relating to the PUCCH allocations may be signalled to the MTC device via higher layers (e.g. by configuring semi-persistent scheduling for the MTC device). Alternatively or additionally, some or all of this information can be obtained by the MTC device in a different manner. Furthermore, the applicable PUCCH configuration may not be explicitly signalled by the base station and may instead be determined based upon other information, such as a cell ID associated with the base station and/or a device ID associated with the MTC device. This has the benefit of reducing the amount of data that has to be signalled to the communication devices.

It will be appreciated that although the communication system is described in terms of the base station operating as a E-UTRAN base station (eNB), the same principles may be applied to base stations operating as macro or pico base stations, femto base stations, relay nodes providing elements of base station functionality, home base stations (HeNB), or other such communication nodes.

In the above embodiments, an LTE telecommunications system was described. As those skilled in the art will appreciate, the techniques described in the present application can be employed in other communications systems, including earlier 3GPP type systems. Other communications nodes or devices may include user devices such as, for example, personal digital assistants, laptop computers, web browsers, etc.

In the embodiments described above, the base station and the communication device each include transceiver circuitry. Typically, this circuitry will be formed by dedicated hardware circuits. However, in some embodiments, part of the transceiver circuitry may be implemented as software run by the corresponding controller.

In the above embodiments, a number of software modules were described. As those skilled in the art will appreciate, the software modules may be provided in compiled or un-compiled form and may be supplied to the base station or the user device as a signal over a computer network, or on a recording medium. Further, the functionality performed by part or all of this software may be performed using one or more dedicated hardware circuits.

In the above embodiments, machine-type communication devices and mobile telephones are described. However, it will be appreciated that mobile telephones (and similar user equipment) may also be configured to operate as machine-type communication devices. For example, the mobile telephone 3-1 may include (and/or provide the functionality of) the MTC module 45.

Examples of MTC Applications

It will be appreciated that each communication device may support one or more MTC applications. Some examples of MTC applications are listed in the following table (source: 3GPP TS 22.368, Annex B). This list is not exhaustive and is intended to be indicative of the scope of machine-type communication applications.

TABLE 1

| Service Area | MTC applications |
| --- | --- |
| Security | Surveillance systems |
|  | Backup for landline |
|  | Control of physical access |
|  | (e.g. to buildings) |
|  | Car/driver security |
| Tracking & Tracing | Fleet Management |
|  | Order Management |
|  | Pay as you drive |
|  | Asset Tracking |
|  | Navigation |
|  | Traffic information |
|  | Road tolling |
|  | Road traffic optimisation/steering |
| Payment | Point of sales |
|  | Vending machines |
|  | Gaming machines |
| Health | Monitoring vital signs |
|  | Supporting the aged or handicapped |
|  | Web Access Telemedicine points |
|  | Remote diagnostics |
| Remote | Sensors |
| Maintenance/Control | Lighting |
|  | Pumps |
|  | Valves |
|  | Elevator control |
|  | Vending machine control |
|  | Vehicle diagnostics |
| Metering | Power |
|  | Gas |
|  | Water |
|  | Heating |
|  | Grid control |
|  | Industrial metering |
| Consumer Devices | Digital photo frame |
|  | Digital camera |
|  | eBook |

Various other modifications will be apparent to those skilled in the art and will not be described in further detail here.

This invention has been described by way of embodiments above, but this invention is not limited to the embodiments. A part or the entirety of the above-mentioned embodiments may be described by way of the following supplementary notes, but this invention is not limited to the following supplementary notes.

(Supplementary Note 1)

A communication node for a communication system, wherein the communication node comprises:

means for operating a cell having a cell bandwidth;

means for communicating, with a plurality of different types of communication devices within said cell, wherein said plurality of different types of communication devices include a reduced bandwidth machine-type communication, 'MTC', device having a bandwidth that is small compared to the cell bandwidth; and means for allocating frequency resources respectively to each communication device operating within said cell, for use in transmitting uplink control data, in dependence on whether or not that communication device is an MTC device;

wherein said allocating means is operable to allocate said frequency resources such that:

when the communication device is a reduced bandwidth MTC device, said MTC device communicates uplink control data using a first frequency resource in a first slot of a subframe and a second frequency resource in a second slot of that subframe wherein said first frequency resource and said second frequency resource share the same frequency or are separated in frequency by no more than the bandwidth of the reduced bandwidth MTC device; and when the communication device is not a reduced bandwidth MTC device, said communication device that is not a reduced bandwidth MTC device communicates uplink control data using a first non-MTC frequency resource in the first slot of a subframe and a second non-MTC frequency resource in the second slot of that subframe wherein said first non-MTC frequency resource and said second non-MTC frequency resource are separated in frequency by more than the bandwidth of the reduced bandwidth MTC device; and wherein said communicating means is operable to receive uplink control information from each communication device operating within said cell using the respective frequency resources allocated to each communication device operating within said cell in dependence on whether or not that communication device is an MTC device.

(Supplementary Note 2)

A communication node of the supplementary note 1 wherein said first frequency resource and said second frequency resource are separated in frequency by no more than the bandwidth of the reduced bandwidth MTC device and are respectively above and below a centre frequency of said cell bandwidth.

(Supplementary Note 3)

A communication node of the supplementary note 1 wherein said first frequency resource and said second frequency resource share the same frequency.

(Supplementary Note 4)

A communication node of any one of the supplementary notes 1 of 3 wherein said first frequency resource, said second frequency resource, said first non-MTC resource and said second non-MTC resource all form part of a common uplink control channel region (e.g. a physical uplink control channel, 'PUCCH').

(Supplementary Note 5)

A communication node of any one of the supplementary notes 1 of 3 wherein said first non-MTC resource and said second non-MTC resource form part of an uplink control channel region (e.g. a physical uplink control channel, 'PUCCH') that does not extend across a centre of the cell bandwidth, and said first frequency resource and said second frequency resource form part of another separate region.

(Supplementary Note 6)

A communication node of the supplementary note 5 wherein said separate region extends across the centre of the cell bandwidth.

(Supplementary Note 7)

A communication node of the supplementary note 5 or 6 wherein said first frequency resource and said second frequency resource form part of a further MTC dedicated uplink control channel region (e.g. an MTC physical uplink control channel, 'PUCCH') that is separate from said uplink control channel region comprising said first non-MTC resource and said second non-MTC resource.

(Supplementary Note 8)

A communication node of the supplementary note 5 or 6 wherein said first frequency resource and said second frequency resource form part of an uplink shared channel region (e.g. a shared data channel/physical uplink shared channel, 'PUSCH').

(Supplementary Note 9)

A communication node of any one of the supplementary note 1 to 8 wherein said communicating means is further operable to communicate, with an enhanced coverage MTC device having enhanced coverage compared to other MTC devices and wherein said allocating means is operable to allocate said frequency resources such that: when the communication device is an enhanced coverage MTC device, said MTC device communicates uplink control data using a further first frequency resource in a first slot of a subframe and a further second frequency resource in a second slot of that subframe wherein said further first frequency resource and said further second frequency resource share the same frequency or are separated in frequency by no more than the bandwidth of a reduced bandwidth MTC device.

(Supplementary Note 10)

A machine-type communication, 'MTC', device for a communication system in which a plurality of different types of communication devices can communicate with a communication node that operates a cell having a cell bandwidth, wherein the plurality of different types of communication devices include a reduced bandwidth machine-type communication, 'MTC', device having a bandwidth that is small compared to the cell bandwidth, wherein the MTC device comprises:

means for communicating with the communication node within the cell operated by that communication node; and means for obtaining an allocation of frequency resources, for use in transmitting uplink control data to the communication node, wherein said allocation is such that said communicating means communicates uplink control data using a first frequency resource in a first slot of a subframe and a second frequency resource in a second slot of that subframe wherein said first frequency resource and said second frequency resource share the same frequency or are separated in frequency by no more than the bandwidth of a reduced bandwidth MTC device; and wherein said communicating means is operable to transmit uplink control information using the allocation of frequency resources.

(Supplementary Note 11)

A machine-type communication, 'MTC', device for a communication system in which a plurality of different types of communication devices can communicate with a communication node that operates a cell having a cell bandwidth, wherein the plurality of different types of communication devices include a reduced bandwidth machine-type communication, 'MTC', device having a bandwidth that is small compared to the cell bandwidth, wherein the MTC device comprises:

means for communicating with the communication node within the cell operated by that communication node and using frequency resources within a frequency of an MTC frequency band;

means for moving a carrier frequency of said MTC frequency band; and means for obtaining an allocation of frequency resources, for use in transmitting uplink control data to the communication node wherein said allocation is such that said communicating means communicates uplink control data using a first frequency resource in a first slot of a subframe and a second frequency resource in a second slot of that subframe wherein said first frequency resource and said second frequency resource share the same frequency or are separated in frequency by more than the bandwidth of a reduced bandwidth MTC device;

wherein said carrier frequency moving means is operable to move said carrier frequency between said first slot and said second slot such that said MTC frequency band includes the first frequency resource in the first slot of the subframe and includes the second frequency resource in the second slot of said subframe; and whereby said communicating means is operable to transmit uplink control information using the first frequency resource in the first slot of the subframe and to transmit uplink control information using the second frequency resource in the second slot of said subframe.

(Supplementary Note 12)

An MTC device of the supplementary note 10 or 11 wherein said MTC device is an enhanced coverage MTC device.

(Supplementary Note 13)

An MTC device of the supplementary note 10 or 11 wherein said MTC device is a reduced bandwidth MTC device.

(Supplementary Note 14)

A communication node for a communication system, wherein the communication node comprises:

means for operating a cell; and means for communicating with a plurality of different types of communication devices within said cell using radio frames, each radio frame comprising a sequence of subframes, wherein said plurality of different types of communication devices include a machine-type communication, 'MTC', device;

wherein said communicating means is operable:

to provide downlink control channel signalling for at least one MTC device in a first of said subframes, and to repeat said downlink control channel signalling in at least one subsequent subframe;

to provide downlink shared channel signalling for said at least one MTC device in a subframe subsequent to said subframes in which said downlink control channel signalling is provided and to repeat said downlink shared channel signalling in at least one subsequent subframe; and to receive, from the at least one MTC device, uplink control information relating to said downlink shared channel signalling in a subframe subsequent to said subframes in which said downlink shared channel signalling is provided and to receive a repetition of said uplink control information in at least one subsequent subframe.

(Supplementary Note 15)

A communication node of the supplementary note 14 further comprising means for semi-statically allocating resources to said at least one MTC device for use in transmitting said uplink control information relating to said downlink shared channel signalling.

(Supplementary Note 16)

A communication node of the supplementary note 14 or 15 wherein said communicating means is operable to: first receive, from the at least one MTC device, said uplink control information relating to said downlink shared channel signalling in a subframe that is a fourth subframe subsequent to a last of said subframes in which said downlink shared channel signalling is provided.

(Supplementary Note 17)

A machine-type communication, 'MTC', device for a communication system, wherein the MTC device comprises:

means for communicating, with a communication node within a cell operated by that communication node, using radio frames, each radio frame comprising a sequence of subframes;

wherein said communicating means is operable:

to receive downlink control channel signalling for said MTC device in a first of said subframes, and a repetition of said downlink control channel signalling in at least one subsequent subframe;

to receive downlink shared channel signalling for said MTC device in a subframe subsequent to said subframes in which said downlink control channel signalling is received and a repetition of said downlink shared channel signalling in at least one subsequent subframe; and to provide, to said communication node, uplink control information relating to said downlink shared channel signalling in a subframe subsequent to said subframes in which said downlink shared channel signalling is received and to repeat said uplink control information in at least one subsequent subframe.

(Supplementary Note 18)

A communication node for a communication system, wherein the communication node comprises:

means for operating a cell;

means for communicating with a plurality of different types of communication devices within said cell using radio frames, each radio frame comprising a sequence of subframes, wherein said plurality of different types of communication devices include a machine-type communication, 'MTC', device; and means for semi-statically allocating resources to at least one MTC device for use in transmitting uplink control information relating to downlink shared channel signalling;

wherein said communicating means is operable:

to provide downlink shared channel signalling for said at least one MTC device in a subframe; and to receive from the at least one MTC device, using said semi-statically allocated resources, uplink control information relating to said downlink shared channel signalling in a subframe subsequent to said subframe in which said downlink shared channel signalling is provided, wherein the subframe in which said uplink control information is received is a fourth of a plurality of subframes subsequent to said subframe in which said downlink shared channel signalling is provided.

(Supplementary Note 19)

A machine-type communication, 'MTC', device for a communication system, wherein the MTC device comprises:

means for communicating, with a communication node within a cell operated by that communication node, using radio frames, each radio frame comprising a sequence of subframes;

means for receiving, semi-statically, an allocation of resources for said MTC device for use in transmitting uplink control information relating to downlink shared channel signalling;

wherein said communicating means is operable:

to receive downlink shared channel signalling for said MTC device in a subframe; and to provide, to said communication node, using said semi-statically allocated resources, uplink control information relating to said downlink shared channel signalling in a subframe subsequent to said subframe in which said downlink shared channel signalling is received, wherein the subframe in which said uplink control information is provided is a fourth of a plurality of subframes subsequent to said subframe in which said downlink shared channel signalling is received.

(Supplementary Note 20)

A communication node for a communication system, wherein the communication node comprises:

means for operating a cell; and means for communicating with a plurality of different types of communication devices within said cell using radio frames, each radio frame comprising a sequence of subframes, wherein said plurality of different types of communication devices include a machine-type communication, 'MTC', device; and wherein said communicating means is operable:

to provide downlink shared channel signalling for at least one MTC device in a subframe; and to receive, from the at least one MTC device, uplink control information relating to said downlink shared channel signalling in a subframe subsequent to said subframe in which said downlink shared channel signalling is provided, wherein the subframe in which said uplink control information is received is a third of a plurality of subframes subsequent to said subframe in which said downlink shared channel signalling is provided.

(Supplementary Note 21)

A machine-type communication, 'MTC', device for a communication system, wherein the MTC device comprises:

means for communicating, with a communication node within a cell operated by that communication node, using radio frames, each radio frame comprising a sequence of subframes;

wherein said communicating means is operable:

to receive downlink shared channel signalling for an MTC device in a subframe; and to provide, to said communication node, uplink control information relating to said downlink shared channel signalling in a subframe subsequent to said subframe in which said downlink shared channel signalling is received, wherein the subframe in which said uplink control information is provided is a third of a plurality of subframes subsequent to said subframe in which said downlink shared channel signalling is received.

(Supplementary Note 22)

A method performed by a communication node of a communication system, wherein the method comprises:

operating a cell having a cell bandwidth;

communicating, with a plurality of different types of communication devices within said cell, wherein said plurality of different types of communication devices include a reduced bandwidth machine-type communication, 'MTC', device having a bandwidth that is small compared to the cell bandwidth; and allocating frequency resources respectively to each communication device operating within said cell, for use in transmitting uplink control data, in dependence on whether or not that communication device is an MTC device;

wherein said allocating comprises allocating said frequency resources such that:

when the communication device is a reduced bandwidth MTC device, said MTC device communicates uplink control data using a first frequency resource in a first slot of a subframe and a second frequency resource in a second slot of that subframe wherein said first frequency resource and said second frequency resource share the same frequency or are separated in frequency by no more than the bandwidth of the reduced bandwidth MTC device; and when the communication device is not a reduced bandwidth MTC device, said communication device that is not a reduced bandwidth MTC device communicates uplink control data using a first non-MTC frequency resource in the first slot of a subframe and a second non-MTC frequency resource in the second slot of that subframe wherein said first non-MTC frequency resource and said second non-MTC frequency resource are separated in frequency by more than the bandwidth of the reduced bandwidth MTC device; and wherein said communicating comprises receiving uplink control information from each communication device operating within said cell using the respective frequency resources allocated to each communication device operating within said cell in dependence on whether or not that communication device is an MTC device.

(Supplementary Note 23)

A method performed by a machine-type communication, 'MTC', device of a communication system in which a plurality of different types of communication devices can communicate with a communication node that operates a cell having a cell bandwidth, wherein the plurality of different types of communication devices include a reduced bandwidth MTC device having a bandwidth that is small compared to the cell bandwidth, wherein the method comprises:

communicating with the communication node within the cell operated by that communication node; and obtaining an allocation of frequency resources, for use in transmitting uplink control data to the communication node, wherein said allocation is such that said communicating communicates uplink control data using a first frequency resource in a first slot of a subframe and a second frequency resource in a second slot of that subframe wherein said first frequency resource and said second frequency resource share the same frequency or are separated in frequency by no more than the bandwidth of a reduced bandwidth MTC device; and wherein said communicating comprises transmitting uplink control information using the allocation of frequency resources.

(Supplementary Note 24)

A method performed by a machine-type communication, 'MTC', device of a communication system in which a plurality of different types of communication devices can communicate with a communication node that operates a cell having a cell bandwidth, wherein the plurality of different types of communication devices include a reduced bandwidth MTC device having a bandwidth that is small compared to the cell bandwidth, wherein the method comprises:

communicating with the communication node within the cell operated by that communication node and using frequency resources within a frequency of an MTC frequency band;

obtaining an allocation of frequency resources, for use in transmitting uplink control data to the communication node wherein said allocation is such that said communicating communicates uplink control data using a first frequency resource in a first slot of a subframe and a second frequency resource in a second slot of that subframe wherein said first frequency resource and said second frequency resource share the same frequency or are separated in frequency by more than the bandwidth of a reduced bandwidth MTC device;

moving a carrier frequency of said MTC frequency band between said first slot and said second slot such that said MTC frequency band includes the first frequency resource in the first slot of the subframe and includes the second frequency resource in the second slot of said subframe; and whereby said communicating comprises transmitting uplink control information using the first frequency resource in the first slot of the subframe and transmitting uplink control information using the second frequency resource in the second slot of said subframe.

(Supplementary Note 25)

A method performed by a communication node of a communication system, wherein the method comprises:

operating a cell; and communicating with a plurality of different types of communication devices within said cell using radio frames, each radio frame comprising a sequence of subframes, wherein said plurality of different types of communication devices include a machine-type communication, 'MTC', device;

wherein said communicating comprises:

providing downlink control channel signalling for at least one MTC device in a first of said subframes, and repeating said downlink control channel signalling in at least one subsequent subframe;

providing downlink shared channel signalling for said at least one MTC device in a subframe subsequent to said subframes in which said downlink control channel signalling is provided and repeating said downlink shared channel signalling in at least one subsequent subframe; and receiving, from the at least one MTC device, uplink control information relating to said downlink shared channel signalling in a subframe subsequent to said subframes in which said downlink shared channel signalling is provided and receiving a repetition of said uplink control information in at least one subsequent subframe.

(Supplementary Note 26)

A method performed by a machine-type communication, 'MTC', device of a communication system, wherein the method comprises:

communicating, with a communication node within a cell operated by that communication node, using radio frames, each radio frame comprising a sequence of subframes;

wherein said communicating comprises:

receiving downlink control channel signalling for said MTC device in a first of said subframes, and receiving a repetition of said downlink control channel signalling in at least one subsequent subframe;

receiving downlink shared channel signalling for said MTC device in a subframe subsequent to said subframes in which said downlink control channel signalling is received and a receiving repetition of said downlink shared channel signalling in at least one subsequent subframe; and providing, to said communication node, uplink control information relating to said downlink shared channel signalling in a subframe subsequent to said subframes in which said downlink shared channel signalling is received and repeating said uplink control information in at least one subsequent subframe.

(Supplementary Note 27)

A method performed by a communication node of a communication system, wherein the method comprises:

operating a cell;

communicating with a plurality of different types of communication devices within said cell using radio frames, each radio frame comprising a sequence of subframes, wherein said plurality of different types of communication devices include a machine-type communication, 'MTC', device; and semi-statically allocating resources to at least one MTC device for use in transmitting uplink control information relating to downlink shared channel signalling;

wherein said communicating comprises:

providing downlink shared channel signalling for at least one MTC device in a subframe; and receiving from the at least one MTC device, using said semi-statically allocated resources, uplink control information relating to said downlink shared channel signalling in a subframe subsequent to said subframe in which said downlink shared channel signalling is provided, wherein the subframe in which said uplink control information is received is a fourth of a plurality of subframes subsequent to said subframe in which said downlink shared channel signalling is provided.

(Supplementary Note 28)

A method performed by a machine-type communication, 'MTC', device of a communication system, wherein the method comprises:

communicating, with a communication node within a cell operated by that communication node, using radio frames, each radio frame comprising a sequence of subframes;

receiving, semi-statically, an allocation of resources for said MTC device for use in transmitting uplink control information relating to downlink shared channel signalling;

wherein said communicating comprises:

receiving downlink shared channel signalling for said MTC device in a subframe; and to providing, to said communication node, using said semi-statically allocated resources, uplink control information relating to said downlink shared channel signalling in a subframe subsequent to said subframe in which said downlink shared channel signalling is received, wherein the subframe in which said uplink control information is provided is a fourth of a plurality of subframes subsequent to said subframe in which said downlink shared channel signalling is received.

(Supplementary Note 29)

A method performed by a communication node of a communication system, wherein the method comprises:

operating a cell; and communicating with a plurality of different types of communication devices within said cell using radio frames, each radio frame comprising a sequence of subframes, wherein said plurality of different types of communication devices include a machine-type communication, 'MTC', device; and wherein said communicating comprises:

providing downlink shared channel signalling for at least one MTC device in a subframe; and receiving, from the at least one MTC device, uplink control information relating to said downlink shared channel signalling in a subframe subsequent to said subframe in which said downlink shared channel signalling is provided, wherein the subframe in which said uplink control information is received is a third of a plurality of subframes subsequent to said subframe in which said downlink shared channel signalling is provided.

(Supplementary Note 30)

A method performed by a machine-type communication, 'MTC', device of a communication system, wherein the method comprises:

communicating, with a communication node within a cell operated by that communication node, using radio frames, each radio frame comprising a sequence of subframes;

wherein said communicating comprises:

receiving downlink shared channel signalling for an MTC device in a subframe; and providing, to said communication node, uplink control information relating to said downlink shared channel signalling in a subframe subsequent to said subframe in which said downlink shared channel signalling is received, wherein the subframe in which said uplink control information is provided is a third of a plurality of subframes subsequent to said subframe in which said downlink shared channel signalling is received.

(Supplementary Note 31)

A communication system comprising at least one communication node according to any of the supplementary notes 1 to 9, 14 to 16, 18 or 20 and at least one machine-type communication, 'MTC', device according to any of the supplementary notes 10 to 13, 17, 19 or 21.

(Supplementary Note 32)

A computer program product comprising computer implementable instructions for causing processing apparatus to perform the method of any of the supplementary notes 22 to 30.

This application is based upon and claims the benefit of priority from United Kingdom patent application No. 1416796.9, filed on Sep. 23, 2014, the disclosure of which is incorporated herein in its entirety by reference.

What is claimed is:

1. A communication apparatus which is operable to communicate with at least one of a first, bandwidth limited, type user equipment (UE) and a second type UE, the communication apparatus comprising:

a processor; and a transceiver, wherein the processor is configured to assign a first frequency resource for a first physical uplink control channel (PUCCH) for the first, bandwidth limited, type UE, wherein the first PUCCH is initially carried by a first narrowband that is small relative to a transmission bandwidth in a cell, and wherein the first PUCCH is subsequently, following a retuning by the first, bandwidth limited, type UE, carried by a second narrowband that is small relative to the transmission bandwidth in the cell, wherein the second narrowband is different from the first narrowband, wherein, for a PUCCH transmission for the first, bandwidth limited, type UE, a resource block to be used in the first narrowband is at a first position within a total number of resource blocks in the transmission bandwidth in the cell, and wherein a resource block to be used for said PUCCH transmission for the first, bandwidth limited, type UE in the second narrowband is at a second position within the total number of resource blocks in the transmission bandwidth in the cell that is equal to the total number of resource blocks in the transmission bandwidth in the cell less the first position, and wherein the processor is further configured to assign a second frequency resource for a second physical uplink control channel (PUCCH) for the second type UE.

2. The communication apparatus according to claim 1, wherein the processor is further configured to multiplex the first frequency resource and the second frequency resource.

3. The communication apparatus according to claim 1, wherein the processor is further configured to assign the first PUCCH such that the second narrowband effectively mirrors the first narrowband around a centre of the transmission bandwidth in the cell.

4. The communication apparatus according to claim 1, wherein the frequency resource for the first PUCCH changes from end of one slot to beginning of next slot.

5. The communication apparatus according to claim 1, wherein the first and second narrowbands comprise respective bandwidths that are small compared to the transmission bandwidth in the cell.

6. The communication apparatus according to claim 1, wherein the communication apparatus is an Evolved Universal Terrestrial Radio Access (E-UTRA) base station.

7. User equipment (UE) which is operable to communicate with a communication apparatus, the UE comprising:

a processor configured to determine a first frequency resource which is assigned for a first physical uplink control channel (PUCCH) for a bandwidth limited type UE; and a transceiver circuit configured to transmit via the first PUCCH based on the first frequency resource;

wherein the UE is configured to retune the transceiver circuit to move between a first narrowband that is small relative to a transmission bandwidth in a cell and a second narrowband that is small relative to the transmission bandwidth in the cell, wherein the second narrowband is different from the first narrowband, wherein the first PUCCH is initially carried by the first narrowband and wherein the first PUCCH is subsequently carried by the second narrowband following retuning, and wherein, for a PUCCH transmission for the bandwidth limited type UE, a resource block to be used in the first narrowband is at a first position within a total number of resource blocks in the transmission bandwidth in the cell, and wherein a resource block to be used for said PUCCH transmission for the bandwidth limited type UE in the second narrowband is at a second position within the total number of resource blocks in the transmission bandwidth in the cell that is equal to the total number of resource blocks in the transmission bandwidth in the cell less the first position.

8. The UE according to claim 7, wherein the transceiver circuit is further configured not to transmit during retuning.

9. The UE according to claim 7, wherein the UE is a coverage enhanced UE.

10. A system comprising a communication apparatus and a User Equipment (UE), the communication apparatus being operable to communicate with at least one of a first, bandwidth limited, type user equipment (UE) and a second type UE, the UE being operable to communicate with a communication apparatus, the communication apparatus comprising:

a processor; and a transceiver, wherein the processor is configured to assign a first frequency resource for a first physical uplink control channel (PUCCH) for the first, bandwidth limited, type UE, wherein the first PUCCH is initially carried by a first narrowband that is small relative to a transmission bandwidth in a cell, and wherein the first PUCCH is subsequently, following a retuning by the first, bandwidth limited, type UE, carried by a second narrowband that is small relative to the transmission bandwidth in the cell, wherein the second narrowband is different from the first narrowband, wherein, for a PUCCH transmission for the first, bandwidth limited, type UE, a resource block to be used in the first narrowband is at a first position within a total number of resource blocks in the transmission bandwidth in the cell, and wherein a resource block to be used for said PUCCH transmission for the first, bandwidth limited, type UE in the second narrowband is at a second position within the total number of resource blocks in the transmission bandwidth in the cell that is equal to the total number of resource blocks in the transmission bandwidth in the cell less the first position, and wherein the processor is further configured to assign a second frequency resource for a second physical uplink control channel (PUCCH) for the second type UE, the UE comprising:
- a processor configured to determine a first frequency resource which is assigned for a first physical uplink control channel (PUCCH) for a bandwidth limited type UE; and
- a transceiver circuit configured to transmit via the first PUCCH based on the first frequency resource,
- wherein the UE is configured to retune the transceiver circuit to move between a first narrowband that is small relative to the transmission bandwidth in the cell and a second narrowband that is small relative to the transmission bandwidth in the cell, and
- wherein the first PUCCH is initially carried by the first narrowband and wherein the first PUCCH is subsequently carried by the second narrowband following retuning.

11. A method performed by a communication apparatus which is operable to communicate with at least one of a first, bandwidth limited, type user equipment (UE) and a second type UE, the method comprising:
- assigning a first frequency resource for a first physical uplink control channel (PUCCH) for the first, bandwidth limited, type UE, wherein the first PUCCH is initially carried by a first narrowband that is small relative to a transmission bandwidth in a cell, and wherein the first PUCCH is subsequently, following a retuning by the first, bandwidth limited, type UE, carried by a second narrowband that is small relative to the transmission bandwidth in the cell,
- wherein the second narrowband is different from the first narrowband, and
- wherein, for a PUCCH transmission for the first, bandwidth limited, type UE, a resource block to be used in the first narrowband is at a first position within a total number of resource blocks in the transmission bandwidth in the cell, and wherein a resource block to be used for said PUCCH transmission for the first, bandwidth limited, type UE in the second narrowband is at a second position within the total number of resource blocks in the transmission bandwidth in the cell that is equal to the total number of resource blocks in the transmission bandwidth in the cell less the first position; and
- assigning a second frequency resource for a second physical uplink control channel (PUCCH) for the second type UE.

12. The method according to claim 11, further comprising multiplexing the first frequency resource and the second frequency resource.

13. The method according to claim 11, further comprising assigning the first PUCCH such that the second narrowband effectively mirrors the first narrowband around a centre of the transmission bandwidth in the cell.

14. The method according to claim 11, wherein the frequency resource for the first PUCCH changes from end of one slot to beginning of next slot.

15. The method according to claim 11, wherein the first and second narrowbands comprise respective bandwidths that are small compared to the transmission bandwidth in the cell.

16. The method according to claim 11, wherein the communication apparatus is an Evolved Universal Terrestrial Radio Access (E-UTRA) base station.

17. A non-transitory medium storing a program comprising computer implementable instructions for causing a programmable communications device to perform the method of claim 11.

* * * * *